United States Patent
Klinger

(10) Patent No.: US 11,249,208 B2
(45) Date of Patent: Feb. 15, 2022

(54) GEOLOGIC STRUCTURAL MODEL GENERATION

(71) Applicant: Schlumberger Technology Corporation, Sugar Land, TX (US)

(72) Inventor: Jimmy Klinger, Rogaland (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 183 days.

(21) Appl. No.: 16/340,131

(22) PCT Filed: Oct. 14, 2016

(86) PCT No.: PCT/IB2016/001642
§ 371 (c)(1),
(2) Date: Apr. 7, 2019

(87) PCT Pub. No.: WO2018/069744
PCT Pub. Date: Apr. 19, 2018

(65) Prior Publication Data
US 2019/0243017 A1    Aug. 8, 2019

(51) Int. Cl.
*G01V 1/30*    (2006.01)
*G01V 99/00*    (2009.01)

(52) U.S. Cl.
CPC .......... *G01V 1/301* (2013.01); *G01V 99/005* (2013.01); *G01V 2210/642* (2013.01); *G01V 2210/665* (2013.01)

(58) Field of Classification Search
CPC ............... G01V 1/301; G01V 99/005; G01V 2210/665; G01V 2210/642
See application file for complete search history.

(56) References Cited

U.S. PATENT DOCUMENTS

| | | | | |
|---|---|---|---|---|
| 4,148,007 A | * | 4/1979 | Okabayashi | G07C 5/0825 340/461 |
| 4,888,577 A | * | 12/1989 | Dunkley | F16H 63/42 340/461 |
| 6,014,343 A | * | 1/2000 | Graf | G01V 11/00 367/38 |
| 6,549,854 B1 | | 4/2003 | Malinverno et al. | |

(Continued)

FOREIGN PATENT DOCUMENTS

| | | |
|---|---|---|
| EP | 2975437 A1 | 1/2016 |
| WO | 2015/031749 A1 | 3/2015 |

OTHER PUBLICATIONS

Souche, et al., "Construction of Structurally and Stratigraphically Consistent Structural Models Using the Volume-Based Modelling Technology: Applications to an Australian Dataset," International Petroleum Technology Conferfence held in Kuala Lumpur, Malaysia, Dec. 10, 2014, pp. 1-12.

Wellmann, et al., "Towards incorporating uncertainty of structural data in 3D geological inversion," Technophysics, Apr. 19, 2010.

Office Action for the cross referenced French patent application 1560580 dated Feb. 8, 2016.

(Continued)

*Primary Examiner* — Mischita L Henson

(57) ABSTRACT

A method (1200) can include receiving implicit functions values for a mesh that represents a geologic environment that includes intersecting faults defined by fault patches (1210); assigning states to the fault patches (1220); revising the implicit function values based at least in part on the assigned states to provide revised implicit function values (1230); and outputting a structural model of the geologic environment based at least in part on the revised implicit function values (1240).

19 Claims, 13 Drawing Sheets

(56) References Cited

U.S. PATENT DOCUMENTS

| | | |
|---|---|---|
| 7,111,681 B2 | 9/2006 | Detournay et al. |
| 8,600,708 B1 | 12/2013 | Mallet et al. |
| 2008/0129731 A1 | 6/2008 | Spicer et al. |
| 2010/0115787 A1 | 5/2010 | Michon |
| 2011/0106507 A1 | 5/2011 | Lepage |
| 2011/0257949 A1 | 10/2011 | Vasudevan et al. |
| 2012/0271552 A1 | 10/2012 | Dashevsky et al. |
| 2013/0238297 A1* | 9/2013 | Lepage ............... G09B 23/40 703/2 |
| 2014/0095078 A1 | 4/2014 | Leahy et al. |
| 2014/0163943 A1 | 6/2014 | Bukhgeym et al. |
| 2014/0222403 A1 | 8/2014 | Lepage et al. |
| 2014/0278298 A1* | 9/2014 | Maerten ............. G01V 99/005 703/2 |
| 2015/0066460 A1 | 3/2015 | Klinger et al. |
| 2017/0115412 A1 | 4/2017 | Pixton |
| 2018/0031719 A1* | 2/2018 | Huang ............... G01V 99/005 |
| 2018/0322232 A1 | 11/2018 | Klinger et al. |
| 2019/0235106 A1* | 8/2019 | Dev ....................... G01V 1/50 |

OTHER PUBLICATIONS

Office Action for the cross referenced French patent application 1560580 dated Jul. 22, 2016.

International Search Report and Written Opinion for the cross referenced International patent application PCT/EP2016/076529 dated Feb. 21, 2017.

International Search Report and Written Opinion for the related International patent application PCT/IB2016/001642 dated Mar. 30, 2017.

Thore et al., "Structural uncertainties: Determination, management, and applications", Geophysics, 2002, 67(3), pp. 840-852.

International Preliminary Report on Patentability dated May 8, 2018 in International Application No. PCT/EP2016/076529, 8 pages.

International Preliminary Report on Patentability dated Apr. 16, 2019 in International Application No. PCT/IB2016/001642, 7 pages.

Tertois, A.-L., et al., "Fault uncertainty and ranking in tetrahedral models", 27th GOCAD Meeting, Jun. 2007, 8 pages.

Mallet, J.-L et al., "Assessing Geometric Uncertainty in Solid Earth Models", 30th GOCAD Meeting, Jun. 2010, 7 pages.

* cited by examiner

GEOLOGIC STRUCTURAL MODEL GENERATION

BACKGROUND

Phenomena associated with a sedimentary basin may be modeled using a mesh, a grid, etc. As an example, a structural model may be created based on data associated with a sedimentary basin. For example, where a basin includes various types of features (e.g., stratigraphic layers, faults, etc.), data associated with such features may be used to create a structural model of the basin. Such a model may be a basis for analysis, further modeling, etc. Various technologies, techniques, etc., described herein pertain to structural modeling, structural models, etc.

SUMMARY

A method can include receiving implicit functions values for a mesh that represents a geologic environment that includes intersecting faults defined by fault patches; assigning states to the fault patches; revising the implicit function values based at least in part on the assigned states to provide revised implicit function values; and outputting a structural model of the geologic environment based at least in part on the revised implicit function values. A system can include a processor; memory operatively coupled to the processor; processor-executable instructions stored in the memory to instruct the system to: receive implicit functions values for a mesh that represents a geologic environment that includes intersecting faults defined by fault patches; assign states to the fault patches; revise the implicit function values based at least in part on the assigned states to provide revised implicit function values; and output a structural model of the geologic environment based at least in part on the revised implicit function values. One or more computer-readable storage media can include processor-executable instructions where the instruction include instructions to instruct a system to: receive implicit functions values for a mesh that represents a geologic environment that includes intersecting faults defined by fault patches; assign states to the fault patches; revise the implicit function values based at least in part on the assigned states to provide revised implicit function values; and output a structural model of the geologic environment based at least in part on the revised implicit function values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
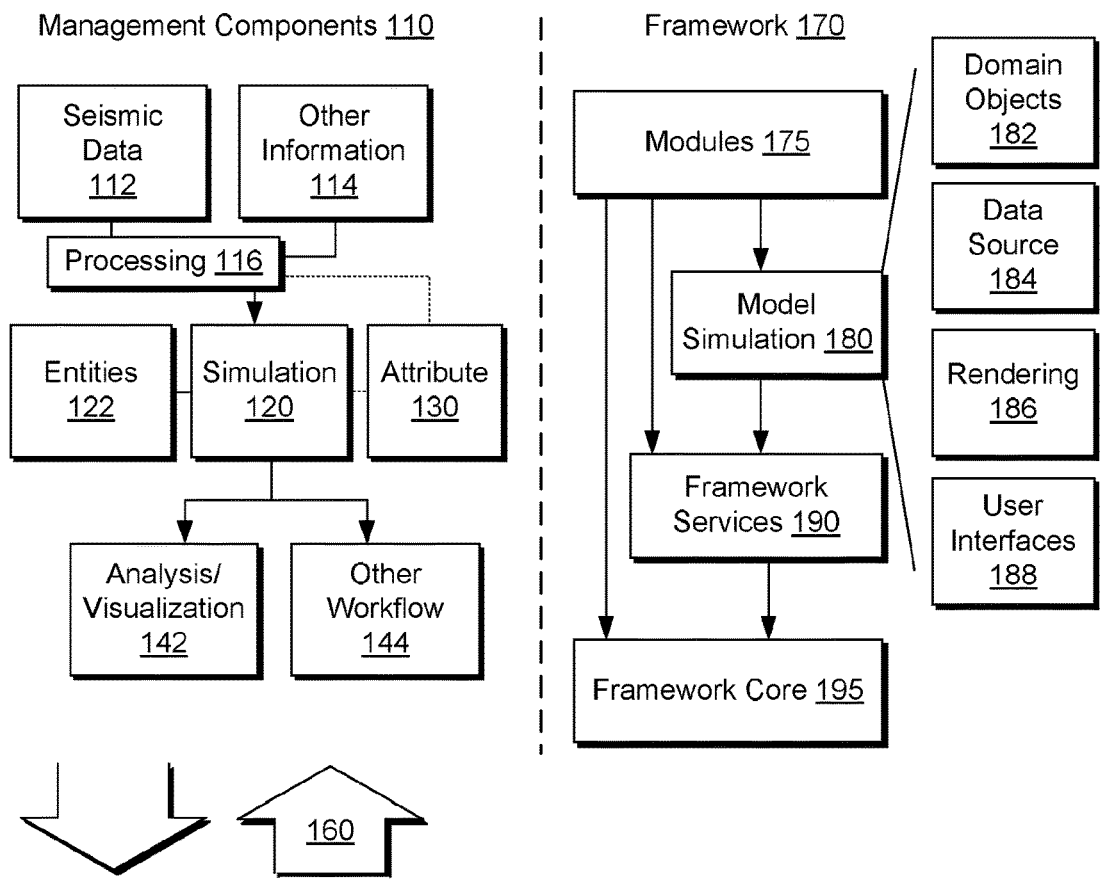
FIG. 1 illustrates an example system that includes various components for simulating a geological environment.
Figure 1:
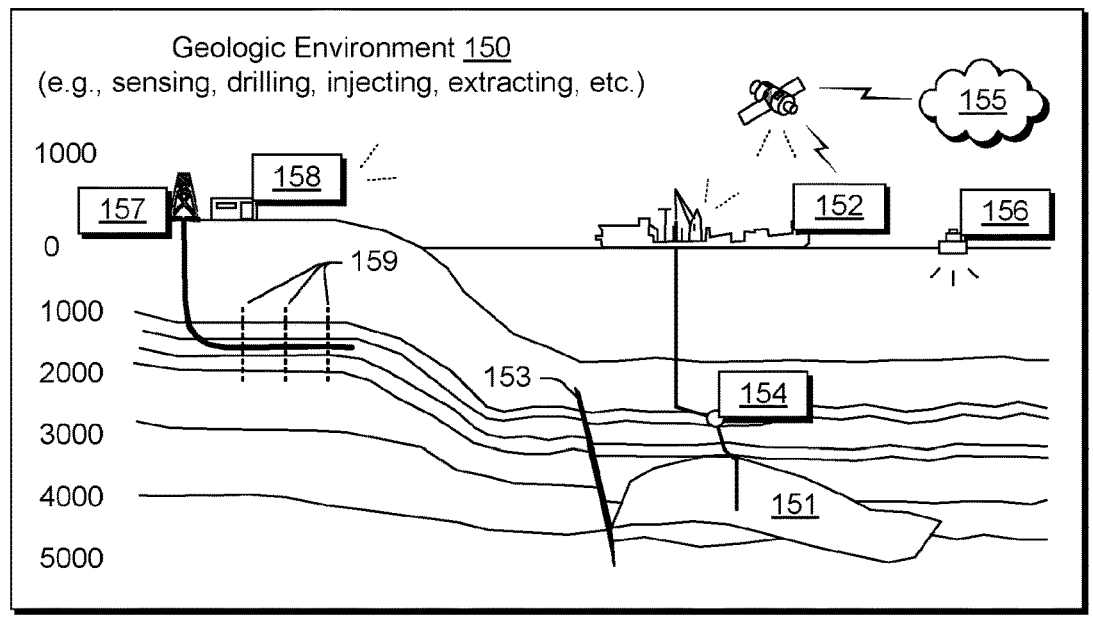

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using a model or models. As an example, a structural model of a basin may find use for understanding various processes related to exploration and production of natural resources (estimating reserves in place, drilling wells, forecasting production, etc.). As an example, a structural model may be used as a basis for building a model for use with a numerical technique.

For application of a numerical technique, equations may be discretized using a grid that includes nodes, cells, etc. To represent features in a geologic environment, a structural model may assist with properly locating nodes, cells, etc. of a grid for use in simulation using one or more numerical techniques. As an example, a structural model may itself include a mesh, which may, at times be referred to as a grid. As an example, a structural model may provide for analysis optionally without resorting to creation of a grid suited for discretization of equations for a numerical solver (e.g., consider a structured grid that may reduce computational demands, etc.).

As to numerical techniques, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multidimensional "elements". For one spatial dimension, an element may be represented by two nodes positioned along a spatial coordinate. For multiple spatial dimensions, an element may include any number of nodes. Further, some equations may be represented by certain nodes while others are represented by fewer nodes (e.g., consider an example for the Navier-Stokes equations where fewer nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As mentioned, where a sedimentary basin (e.g., subsurface region) includes various types of features (e.g., stratigraphic layers, faults, etc.) where nodes, cells, etc. of a mesh or grid may represent, or be assigned to, such features. As an example, consider a structural model that may include one or more meshes. Such a model may serve as a basis for formation of a grid for discretized equations to represent a sedimentary basin and its features.

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a mesh may conform to structural features such as, for example, Y-faults, X-faults, low-angle unconformities, salt bodies, intrusions, etc. (e.g., geological discontinuities), to more fully capture complexity of a geological model. As an example, a mesh may optionally conform to stratigraphy (e.g., in addition to one or more geological discontinuities). As to geological discontinuities, these may include model discontinuities such as one or more model boundaries. As an example, a mesh may be populated with property fields generated, for example, by geostatistical methods.

In general, a relationship may exist between node spacing and phenomenon or phenomena being modeled. Various scales may exist within a geologic environment, for example, a molecular scale may be on the order of approximately $10^{-8}$ to approximately $10^{-8}$ meters, a pore scale may be on the order of approximately $10^{-6}$ to approximately $10^{-3}$ meters, bulk continuum may be on the order of approximately $10^{-3}$ to approximately $10^{0.2}$ meters, and a basin scale on the order of approximately $10^3$ to approximately $10^5$ meters. As an example, nodes of a mesh may be selected based at least in part on the type of phenomenon or phenomena being modeled (e.g., to select nodes of appropriate spacing or spacings). As an example, nodes of a grid may include node-to-node spacing of about 10 meters to about 500 meters. In such an example, a basin being modeled may span, for example, over approximately $10^3$ meters. As an example, node-to-node space may vary, for example, being smaller or larger than the aforementioned spacings.

Some data may be involved in building an initial mesh and, thereafter, a model, a corresponding mesh, etc. may optionally be updated in response to model output, changes in time, physical phenomena, additional data, etc. Data may include one or more of the following: depth or thickness maps and fault geometries and timing from seismic, remote-sensing, electromagnetic, gravity, outcrop and well log data. Furthermore, data may include depth and thickness maps stemming from facies variations.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As an example, a method may include structural modeling, for example, building a structural model, editing a structural model, etc. of a geologic environment. As an example, a workflow may include providing a structural model prior to construction of a grid (e.g., using the structural model), which may, in turn, be suitable for use with one or more numerical techniques. As an example, one or more applications may operate on a structural model (e.g., input of a structural model).

Figure 2:
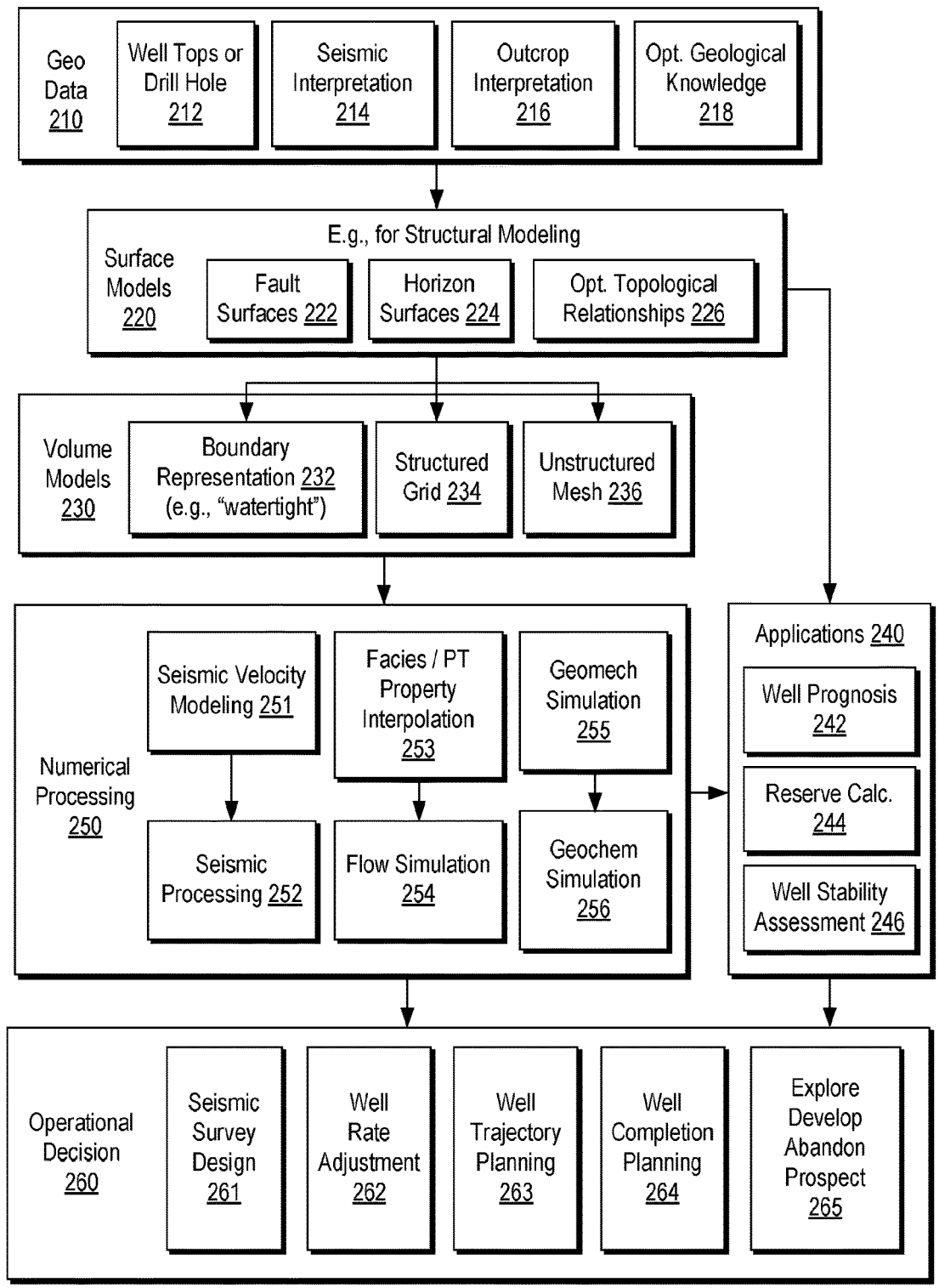
FIG. 2 illustrates an example of a system.

FIG. 2 shows an example of a system 200 that includes a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrotechnical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces, unconformal surfaces, geobodies, etc.) or mechanical discontinuities (fault surfaces) in the subsurface. As an example, a structural model may include some information about one or more topological relationships between surfaces (e.g. fault A truncates fault B, fault B intersects fault C, etc.).

As an example, an environment may include one or more conformal surfaces and/or one or more unconformal surfaces. As an example, an unconformity may be a geological surface that is disposed between older material from younger material (e.g., older rock and younger rock) and that represents a gap in a geologic record. As an example, such a surface might result from a hiatus in deposition of sediments, possibly in combination with erosion, or deformation such as faulting. An angular unconformity may be a type of unconformity that separates younger strata from eroded, dipping older strata. As an example, a disconformity may represent a time of nondeposition, possibly combined with erosion. As an example, a nonconformity may separate overlying strata from eroded, older igneous or metamorphic rocks. As an example, a workflow may include analysis and interpretation of one or more unconformities (e.g., locally, regionally and/or globally) and may include analysis and interpretation of sequence stratigraphy based at least in part thereon.

As an example, a conformable surface may be a conformable horizon surface, for example, a horizon surface between a lower horizon and an upper horizon where the horizons have undergone a relatively common geologic history, for example, being deposited in succession (e.g., continuous in time). As an example, in an environment, horizons may not intersect one another and each of the horizons may be considered conformable to adjacent horizons (e.g., lower and upper or older and younger).

As an example, erosion may act to denude rock, for example, as a result of physical, chemical and/or biological breakdown and/or transportation. Erosion may occur, for example, as material (e.g., weathered from rock, etc.) is transported by fluids, solids (e.g., wind, water or ice) or mass-wasting (e.g., as in rock falls and landslides). As an example, consider two sequences where a lower sequence may have been eroded and an upper sequence deposited on top of the eroded lower sequence. In such an example, the boundary between the two sequences may be referred to as an erosion; noting that it is conformable to the upper, younger sequence. As an example, erosion may act to "truncate" a sequence of horizons and to form surface upon which subsequent material may be deposited (e.g., optionally in a conformable manner).

As an example, a baselap may be a type of feature in an environment, for example, such as a downlap or an onlap. As an example, a downlap may be a termination of more steeply dipping overlying strata against a surface or underlying strata that have lower apparent dips. For example, a downlap may be seen at the base of prograding clinoforms and may represent progradation of a basin margin. As to an onlap, for example, it may be a termination of shallowly dipping, younger strata against more steeply dipping, older strata (e.g., sequence stratigraphy that may occur during periods of transgression). As an example, a type of baselap may be considered to be a downlap (e.g., lower strata having lower apparent dips). In such an example, the baselap boundary tends to be conformable to immediately older horizons (lower sequence).

As an example, given three sequences, a discontinuity may exist as a boundary that is neither conformable to older horizons nor to younger ones. As an example, erosions, baselaps and discontinuities may be referred to as unconformities or non-conformable horizons (e.g., or surfaces, layers, etc.).

As an example, one or more intrusions may exist in an environment. For example, an intrusion may be a structure or structures formed via a process known as sediment injection. For example, consider sills emplaced parallel to bedding or dikes that cut through bedding. Strata that include an intrusion may be referred to as host strata and the layer or layers that feed an intrusion may be referred to as a parent bed or beds. As an example, a sand-injection feature may exhibit a size scale, which may be, for example, of an order within a range of an order of millimeters to an order of kilometers. Evidence of a feature may exist in a core, a borehole image log, a seismic section, an outcrop, an aerial photograph, a satellite image, etc. (e.g., depending on size scale).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

As an example, a method may include implicit modeling that includes using one or more implicit functions. As an example, such a method can include representing geological horizons in three-dimensions using specific iso-surfaces of a scalar property field (e.g., an implicit function) defined on a three-dimensional background mesh. As an example, a method can include representing one or more types of features additionally or alternatively to geological horizons.

For example, consider a method that includes representing one or more unconformities or other types of features.

As an example, a method that includes implicit modeling may assist with exploration and production of natural resources such as, for example, hydrocarbons or minerals. As an example, such a method may include modeling one or more faulted structures that may include geological layers that vary spatially in thickness. As an example, such a method may be employed to model large (basin) scale areas, syn-tectonic deposition, etc.

Figure 3:
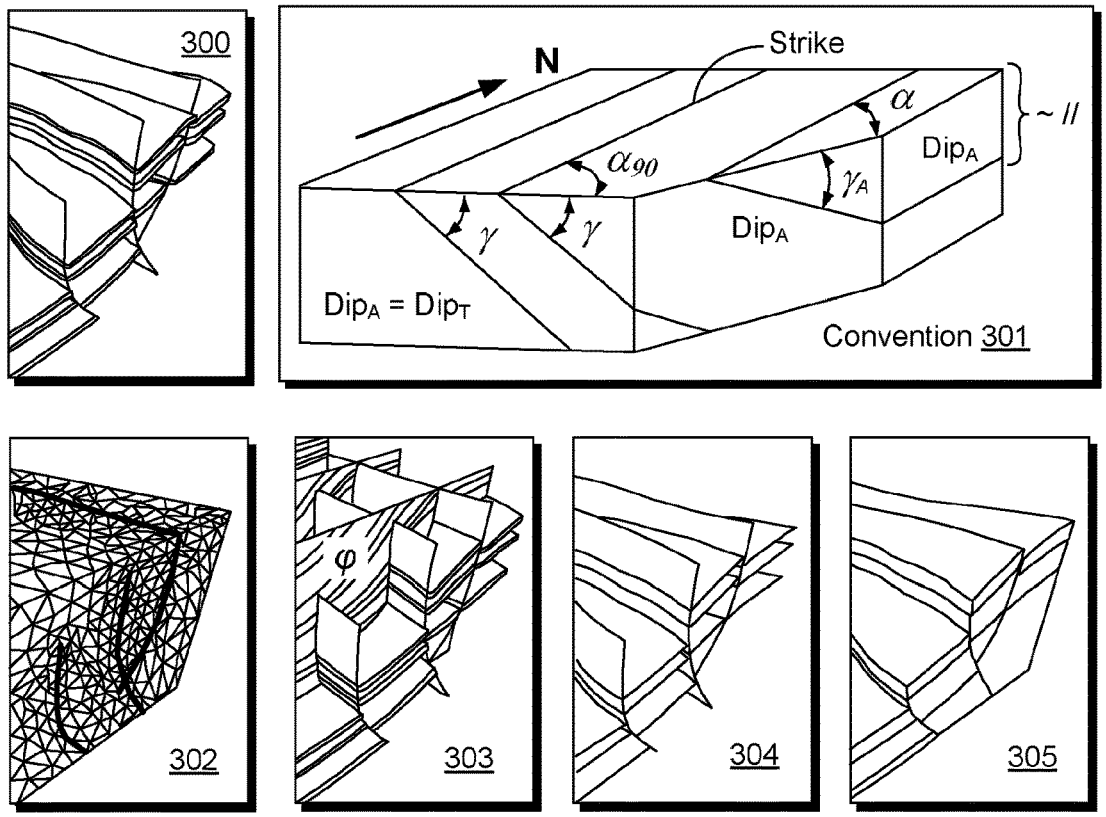
FIG. 3 illustrates examples of a method, a convention, constraints and equations.

FIG. 3 shows an example of a plot of a geologic environment 300 that may be represented in part by a convention 301. As an example, a method may employ implicit modeling to analyze the geologic environment, for example, as shown in the plots 302, 303, 304 and 305. FIG. 3 also shows an example of a control point constraints formulation 310 and an example of a linear system of equations formulation 330, which pertain to an implicit function ($\varphi$).

In FIG. 3, the plot of the geologic environment 300 may be based at least in part on input data, for example, related to one or more fault surfaces, horizon points, etc. As an example, one or more features in such a geologic environment may be characterized in part by dip.

As an example, dip may be specified according to the convention 301, as graphically illustrated in FIG. 3. As shown by the convention 301, the three dimensional orientation of a plane may be defined by its dip and strike. Per the convention 301, dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 301 of FIG. 3, various angles $\gamma$ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). In the convention 301, various angles are represented by the Greek letter gamma as the Greek letter phi appears in association with various examples that include implicit modeling. Another feature shown in the convention 301 of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 301 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 301 of FIG. 3). Apparent dip may be the dip of a plane as measured in any other direction except in the direction of true dip (see, e.g., $\gamma_A$ as $Dip_A$ for angle $\alpha$); however, it is possible that the apparent dip is equal to the true dip (see, e.g., $\gamma$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 301 of FIG. 3, the dip of a plane as seen in a cross-section perpendicular to the strike is true dip (see, e.g., the surface with $\gamma$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 301 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 301 may be used with respect to an analysis, an interpretation, an attribute, a model, etc. (see, e.g., various blocks of the system 100 of FIG. 1 and the system 200 of FIG. 2). As an example, various types of features may be described, in part, by dip (e.g., sedimentary bedding, horizons, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, horizons, faults and fractures, cuestas, igneous dikes and sills, metamorphic foliation, etc.) may be described at least in part by angle, at least in part by azimuth, etc.

Referring to the plots 302, 303, 304 and 305 of FIG. 3, these may represent portions of a method that can generate a model of a geologic environment such as the geologic environment represented in the plot 300.

As an example, a volume based modeling method may include receiving input data (see, e.g., the plot 300); generating a volume mesh, which may be, for example, an unstructured tetrahedral mesh (see, e.g., the plot 302); calculating implicit function values, which may represent stratigraphy and which may be optionally rendered using a periodic map (see, e.g., the plot 303 and the implicit function $\varphi$ as represented using periodic mapping); extracting one or more horizon surfaces as iso-surfaces of the implicit function (see, e.g., the plot 304); and generating a watertight model of geological layers, which may optionally be obtained by subdividing a model at least in part via implicit function values (see, e.g., the plot 305).

As an example, an implicit function calculated for a geologic environment includes isovalues that may represent stratigraphy of modeled layers. For example, depositional interfaces identified via interpretations of seismic data (e.g., signals, reflectors, etc.) and/or on borehole data (e.g., well tops, etc.) may correspond to iso-surfaces of the implicit function. As an example, where reflectors correspond to isochronous geological sequence boundaries, an implicit function may be a monotonous function of stratigraphic age of geologic formations.

As an example, a process for creating a geological model may include: building an unstructured faulted 2D mesh (e.g., if a goal is to build a cross section of a model) or a 3D mesh from a watertight representation of a fault network; representing, according to an implicit function-based volume attribute, stratigraphy by performing interpolations on the built mesh; and cutting the built mesh based at least in part on iso-surfaces of the attribute to generate a volume representation of geological layers. Such a process may include outputting one or more portions of the volume representation of the geological layers (e.g., for a particular layer, a portion of a layer, etc.).

As an example, to represent complex depositional patterns, sequences that may be separated by one or more geological unconformities may optionally be modeled using one or more volume attributes. As an example, a method may include accounting for timing of fault activity (e.g., optionally in relationship to deposition) during construction of a model, for example, by locally editing a mesh on which interpolation is performed (e.g., between processing of two consecutive conformable sequences).

Referring to the control point constraints formulation 310, a tetrahedral cell 312 is shown as including a control point 314. As an example, an implicit function may be a scalar field. As an example, an implicit function may be represented as a property or an attribute, for example, for a volume (e.g., a volume of interest). As an example, the aforementioned PETREL® framework may include a volume attribute that includes spatially defined values that represent values of an implicit function.

As an example, as shown with respect to the linear system of equations formulation 330, a function "F" may be defined for coordinates (x, y, z) and equated with an implicit function denoted $\varphi$. As to constraint values, the function F may be such that each input horizon surface "I" corresponds to a known constant value $h_i$ of $\varphi$. For example, FIG. 3 shows nodes (e.g., vertices) of the cell 312 as including $a_0$, $a_1$, $a_2$ and $a_3$ as well as corresponding values of $\varphi$ (see column vector). As to the values value $h_i$ of $\varphi$, if a horizon I is younger than horizon J, then $h_i > h_j$ and, if one denotes T_ij* as an average thickness between horizons I and J, then $(h_k - h_i)/(h_j - h_i) \sim$ T_ik*/Tij*, for which a method can include estimating values of T_ij* before an interpolation is performed. Note that such a method may, as an example, accept lower values $h_i$ of $\varphi$ for younger horizons, where, for example, a constraint being that, within each conformal sequence, the values $h_i$ of $\varphi$ vary monotonously with respect to the age of the horizons.

As to interpolation of "F", as an example, $\varphi$ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values.

As an example, a method may include using fuzzy control point constraints. For example, at a location of interpretation points, $h_i$ of $\varphi$ (see, e.g. point a* in FIG. 3). As an example, an interpretation point may be located at a location other than that of a node of a mesh onto which an interpolation is performed, for example, as a numerical constraint may be expressed as a linear combination of values of $\varphi$ at nodes of a mesh element (e.g. a tetrahedron, tetrahedral cell, etc.) that includes the interpretation point (e.g., coefficients of a sum being barycentric coordinates of the interpretation point within the element or cell).

For example, for an interpretation point p of a horizon I located inside a tetrahedron which includes vertices are $a_0$, $a_1$, $a_2$ and $a_3$ and which barycentric coordinates are $b_0$, $b_1$, $b_2$ and $b_3$ (e.g., such that the sum of the barycentric coordinates is approximately equal to 1) in the tetrahedron, an equation may be formulated as follows:

$$b_0 \varphi(a_0) + b_1 \varphi(a_1) + b_2 \varphi(a_2) + b_3 \varphi(a_3) = h_i$$

where unknowns in the equation are $\varphi(a_0)$, $\varphi(a_1)$, $\varphi(a_2)$ and $\varphi(a_3)$. For example, refer to the control point $\varphi(a^*)$, labeled 314 in the cell 312 of the control point constraints formulation 310 of FIG. 3, with corresponding coordinates (x*, y*, z*); noting a matrix "M" for coordinates of the nodes or vertices for $a_0$, $a_1$, $a_2$ and $a_3$, (e.g., $x_0$, $y_0$, $z_0$ to $x_3$, $y_3$, $z_3$).

As an example, a number of such constraints of the foregoing type may be based on a number of interpretation points where, for example, interpretation points may be for decimated interpretation (e.g., for improving performance).

As mentioned, a process may include implementing various regularization constraints, for example, for constraining smoothness of interpolated values, of various orders (e.g., constraining smoothness of $\varphi$ or of its gradient $\nabla \varphi$), which may be combined, for example, through a weighted least squares scheme.

As an example, a method can include constraining the gradient $\nabla \varphi$ in a mesh element (e.g. a tetrahedron, a tetrahedral cell, etc.) to take an arithmetic average of values of the gradients of $\varphi$ (e.g., a weighted average) with respect to its neighbors (e.g., topological neighbors). As an example, one or more weighting schemes may be applied (e.g. by volume of an element) that may, for example, include defining of a topological neighborhood (e.g., by face adjacency). As an example, two geometrically "touching" mesh elements that are located on different sides of a fault may be deemed not topological neighbors, for example, as a mesh may be "unsewn" along fault surfaces (e.g., to define a set of elements or a mesh on one side of the fault and another set of elements or a mesh on the other side of the fault).

As an example, within a mesh, if one considers a mesh element $m_i$ that has n neighbors $m_j$ (e.g., for a tetrahedron), one may formulate an equation of an example of a regularization constraint as follows:

$$\nabla \varphi(m_i) = \frac{1}{n} \sum_{j=1}^{n} \nabla \varphi(m_j)$$

In such an example of a regularization constraint, solutions for which isovalues of the implicit function would form a "flat layer cake" or "nesting balls" geometries may be considered "perfectly smooth" (i.e. not violating the regularization constraint), it may be that a first one is targeted.

As an example, one or more constraints may be incorporated into a system in linear form. For example, hard constraints may be provided on nodes of a mesh (e.g., a control node). In such an example, data may be from force values at the location of well tops. As an example, a control gradient, or control gradient orientation, approach may be implemented to impose dip constraints.

Referring again to FIG. 3, the linear system of equations formulation 330 includes various types of constraints. For example, a formulation may include harmonic equation constraints, control point equation constraints (see, e.g., the control point constraints formulation 310), gradient equation constraints, constants gradient equation constraints, etc. As shown in FIG. 3, a matrix A may include a column for each node and a row for each constraint. Such a matrix may be multiplied by a column vector such as the column vector $\varphi(a_i)$ (e.g., or $\varphi$), for example, where the index "i" corresponds to a number of nodes, vertices, etc. for a mesh (e.g., a double index may be used, for example, $a_{ij}$, where j represents an element or cell index). As shown in the example of FIG. 3, the product of A and the vector φ may be equated to a column vector F (e.g., including non-zero entries where appropriate, for example, consider $\phi_{control\ point}$ and $\phi_{gradient}$).

FIG. 3 shows an example of a harmonic constraint graphic 334 and an example of a constant gradient constraint graphic 338. As shown per the graphic 334, nodes may be constrained by a linear equation of a harmonic constraint (e.g., by topological neighbors of a common node). As shown per the graphic 338, two tetrahedra may share a common face (cross-hatched), which is constrained to share a common value of a gradient of the implicit function φ, which, in the example of FIG. 3, constrains the value of φ at the 5 nodes of the two tetrahedra.

As an example, regularization constraints may be used to control interpolation of an implicit function, for example, by constraining variations of a gradient of the implicit function. As an example, constraints may be implemented by specifying (e.g., as a linear least square constraint) that the gradient should be similar in two co-incident elements of a mesh or, for example, by specifying that, for individual elements of a mesh, that a gradient of the implicit function should be an average of the gradients of the neighboring elements. In geological terms, such constraints may translate to (1) minimization of variations of dip and thickness of individual layers, horizontally, and (2) to minimization of the change of relative layer thicknesses, vertically.

As an example, aforementioned effects as to minimization of variations and minimization of changes may impact a resulting model. As an example, a method may include applying one or more techniques that may counter such effects, for example, by splitting a linear system of equations formulation, by splitting one or more trends, etc. As an example, one or more of such techniques may be implemented in response to input data (e.g., seismic interpretation, bore observations, etc.) that indicates that variations of dip, thickness of one or more layers exceed one or more criteria. For example, consider a criterion that acts to classify dip as being large (e.g., more than about 10 degrees of variation of dip of a geological interface), a criterion that acts to classify thickness as being varied (e.g., more than doubling of thickness of a layer from one part to another of a model), etc.

As an example, schematically, computation of an implicit function may be performed in a manner that aims to honor two types of constraints: (1) the minimization of the misfit between the interpretation data and the interpolated surfaces and (2) a regularization constraint that aims to ensure smoothness and monotonicity of an interpolated property.

As explained, values of an implicit function at nodes of a volume mesh may be determined by solving a sparse linear system of equations (see, e.g., the linear system of equations formulation 330 of FIG. 3). As shown in FIG. 3, various constraints may be applied, which may, for example, be selected in an effort to better constrain one or more features (e.g., local dip of a geological layer, etc.) by constraining a gradient of the implicit function. As an example, a solution procedure may include honoring one or more constraints in a least square sense, for example, using a weighted least square scheme that may act to balance effects of contradicting constraints in a solution for a linear system of equations.

As an example, a method may include relaxing one or more regularization constraints used for interpolating an implicit functions, for example, such that the interpolation can account for one or more high frequency thickness variations.

As an example, a method may include removing one or more low frequency trends of thickness variations from data (e.g., input data, etc.), optionally prior to performing an interpolation of an implicit function, and, for example, adding the one or more trends (e.g., as appropriate) back to the implicit function. As an example, such an approach may be applied to complex faulted reservoirs, for example, optionally independently from fault offsets.

As an example, one or more methods may be applied for interpolating an implicit function, for example, with the purpose of representing a set of conformable (e.g., non-intersecting) layers. As an example, a method may employ one or more techniques, for example, a method may employ a relaxation technique, an extraction technique or a relaxation technique and an extraction technique.

Figure 4:
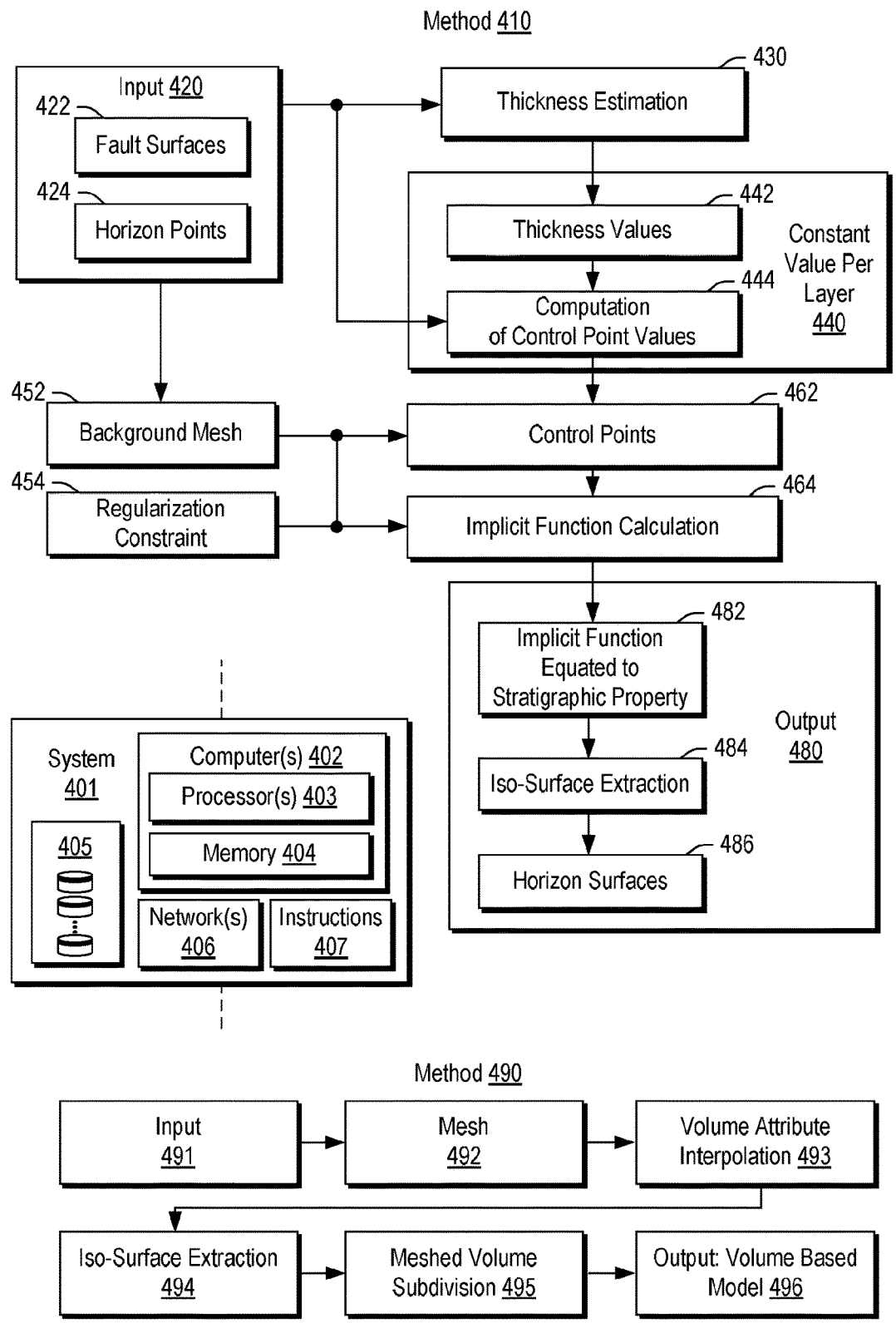
FIG. 4 illustrates an example of a system and an example of a method.

FIG. 4 shows an example of a system 401 and a method 410. As shown in FIG. 4, the system 401 includes one or more computers 402, one or more storage devices 405, one or more networks 406 and one or more modules 407. As to the one or more computers 402, each computer may include one or more processors (e.g., or processing cores) 403 and memory 404 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 405 where the computer(s) 402 may access the data via the network(s) 406 and process the data via the module(s) 407, for example, as stored in the memory 404 and executed by the processor(s) 403.

As an example, a computer or a computing system may include a display or displays. As an example, one or more graphical user interfaces (GUIs) may be rendered to a display or displays. As an example, a display may be a touch screen display. As an example, a computer or a computing system can include one or more input devices and/or input mechanisms. As an example, a GUI may be rendered to a display where an input device and/or input mechanism allows for interactions. For example, where intersecting faults are defined at least in part via fault patches, input may be received by the computer or computing system via an input device and/or an input mechanism to select a fault patch or fault patches and, for example, assign one or more states to a fault patch or fault patches. For example, a user may touch a touch screen display at a fault patch location where a touch may assign a state to the fault patch and/or open a menu for assignment of a state to the fault patch. As an example, a workflow can include rendering representations of fault patches to a display and receiving input to assign states to at least a portion of the fault patches.

FIG. 4 also shows a block diagram of the method 410, which includes an input block 420 and output block 480, for example, to output an implicit function equated to a stratigraphic property per a block 482. As to the input block 420, it may include a fault surfaces input block 422 and a horizon points input block 424. As shown in the example of FIG. 4, the input block 420 may provide input to a thickness estimation block 430, a layer block 440 and a background mesh block 452.

As to the layer block 440, it can include a thickness values block 442 for determining or receiving thickness values (e.g., based on or from the thickness estimation block 430) and a computation block 444 for computing control point values (see, e.g., the formulations 310 and 330 of FIG. 3). As shown, the layer block 440 can output control points to a control points block 462, which may be defined with respect to a mesh provided by the background mesh block 452. As an example, the control points of the control points block 462 may account for one or more regularization constraints per a regularization constraint block 454.

As an example, given control point values for layers definable with respect to a mesh and subject to one or more constraints, a method can include calculating values of an implicit function (e.g., or implicit functions). As shown in the example of FIG. 4, an implicit function calculation block 462 can receive control points and one or more constraints defined with respect to a mesh (e.g., elements, cells, nodes, vertices, etc.) and, in turn, calculate values for one or more implicit functions.

As to the output block 480, given calculated values for one or more implicit functions, these may be associated with, for example, a stratigraphic property per the block 482. As an example, one or more iso-surfaces may be extracted based at least in part on the values of the stratigraphic property per an iso-surface extraction block 484, for example, where one or more of the extracted iso-surfaces may be defined to be a horizon surface (e.g., or horizon surfaces) per a horizon surface block 486.

FIG. 4 also shows an example of a method 490 for outputting a volume based model (e.g., a model constructed from a subdivision of a volume of interest in sub-volumes representing stratigraphic layers, fault blocks or segments, etc.). As shown, the method 490 includes an input block 491 for inputting information (e.g., sealed fault framework information, horizon interpretation information, etc.), a mesh block 492 for providing or constructing a mesh, a volume attribute interpolation block 493 for interpolating values (e.g., using one or more implicit functions), an iso-surface extraction block 494 for extracting one or more iso-surfaces (e.g., based at least in part on the interpolated values), a subdivision block 495 for subdividing a meshed volume (e.g., based at least in part on one or more of the one or more extracted iso-surfaces) and an output block 496 for outputting a volume based model (e.g., based at least in part on one or more portions of a subdivided meshed volume).

As an example, the input block 491 may include one or more features of the input block 420 of the method 410, the mesh block 492 may include one or more features of the mesh block 452 of the method 410, the volume attribute interpolation block 493 may include one or more features of the implicit function calculation block 464 and/or the stratigraphic property block 482 of the method 410, the iso-surface extraction block 494 may include one or more features of the iso-surface extraction block 484 of the method 410, the subdivision block 495 may include subdividing a meshed volume using one or more horizon surfaces per the horizon surfaces block 486 of the method 410 and the output block 496 may include outputting a volume based model based at least in part on one or more outputs of the output block 480 of the method 410.

As explained with respect to the method 410 of FIG. 4, an implicit function may be provided for performing, for example, interpolation. As an example, an implicit modeling approach can include representing surfaces as iso-values of a volume attribute (e.g., of an implicit function). As an example, such a volume attribute may be referred to as being a "thickness proportion" (e.g., volumetrically filling in space). For example, an implicit function may correspond to the stratigraphic age of formations and, for example, such an implicit function may be embedded and interpolated in a volumetrically filling tetrahedral mesh (e.g., structured, unstructured, etc.).

As an example, a method can include building a tetrahedral mesh (e.g., or other type of mesh) for carrying and interpolating an implicit function. As an example, a 3D boundary-constrained Delaunay mesh generator may be implemented, for example, with constraints such as constraints based on faults affecting considered horizons where such faults may be accounted for as internal boundaries during mesh generation, for example, where some border faces of tetrahedra may match fault geometries in a resulting mesh. As an implicit function may be defined and interpolated on nodes of a tetrahedral mesh, density of the mesh, and therefore the spatial resolution of the implicit function, may be controlled, for example, to include a higher density within a shell at, proximate to or around various data and/or faults (e.g., to maximize degree of freedom of an interpolation at or near various data and/or faults). As an example, a mesh adaptation process may include producing tetrahedra that have a vertical resolution higher than their areal resolution (e.g., to better capture thickness variations in layering). As an example, a resulting mesh (e.g., a built mesh) may be unstructured.

As an example, a method can include interpolating values of an implicit function on nodes of a tetrahedral mesh. As an example, an interpolation process may include using a linear least squares formulation, which may tend to minimize misfit between interpretation data and interpolated surfaces and to minimize variations of dip and thickness of layers.

As an example, a method can include generating surfaces representing individual implicitly modeled horizons. In such an example, as the specific value of the implicit function associated to each of the individual horizons may be known, a method may include using an iso-surfacing algorithm. As an example, resolution of a resulting surface or surfaces may be higher or approximately equal to a local resolution of a tetrahedral mesh around sample points (e.g., which may be user-controllable).

As an example, a method may include a volume based modeling approach that generates a consistent zone model (e.g., a model of interpreted geological layers). For example, such a zone model may include an individual geological layer that may be seen as an interval of values of an implicit function. In such an example, given its value of the implicit function, a method may determine to which layer an arbitrary point belongs, in particular where such arbitrary points correspond to nodes of a mesh supporting the implicit function.

As an example, edges of a tetrahedral mesh may intersect limits of geological layers. In such an example, construction of such intersection points may have been computed where they correspond to nodes of triangulated surfaces representing horizons. Accordingly, zones may be built by cutting edges of the tetrahedral mesh by some iso-surfaces of the implicit function.

As an example, a method can include cutting a volume to produce zones that are sets of tetrahedra. As an example, a method can include cutting volume borders to produce zones that are sets of triangulated patches. As to the latter, it may include cutting volume borders by iso-contours. As noted, one or more implicit functions may be formulated for determination of iso-surfaces and/or iso-contours that do not intersect one another other.

As an example, a volume based modeling approach may be less sensitive to complexity of a fault network and may provide conformable horizons belonging to a common conformable sequence (e.g., which may be modeled simultaneously). As to the latter, by using an implicit approach (e.g., by representing sets of conformable horizons by several iso-values of a common implicit attribute), the approach may avoid crossing of conformable horizons.

As an example, a volume based modeling approach may provide for conformable horizons that constrain geometry of other conformable horizons that belong to a common sequence, which itself may be constrained by geometry. As an example, a volume based modeling approach may be applied in scenarios where data are sparse, for example, consider data from well tops, 2D sections, etc. As an example, one or more surfaces may be modeled using seismic data and, for example, globally adjusted using well top data.

As an example, a volume based modeling approach may include outputting geometry of a horizon as well as volume attribute values, which may be defined within a volume of interest and, for example, represent a stratigraphic age, or relative chronostratigraphic age, of a formation (or formations).

As an example, the method 410 of FIG. 4 may include outputting one or more models (e.g., a mesh or meshes, etc.) that account for various features of a geologic environment, for example, where the output model or models is volume filling (e.g., "watertight" or "sealed").

As an example, a method may be implemented to create a reservoir model on a "conformable sequence per conformable sequence" basis, for example, where surfaces belonging to a common conformable sequence may be interpolated simultaneously. As an example, a method can include iteratively editing topology of a volume mesh, for example, to control extent of the volume in which an interpolation is performed and continuity of an interpolated implicit function. As an example, a method may include producing layering that is consistent with a geological style of deposition in one or more eroded areas.

As an example, a method can include building a background mesh, for example, where the background volume mesh covers a volume of interest (VOI), which itself may be of a size sufficient to include horizons to be modeled.

As an example, a method can provide for considering different configurations of a fault framework and, for example, generating results for different configurations. For example, a method can provide a base mesh that corresponds to a base fault framework where one or more variations can be made to the base fault framework and results generated without alteration of the base mesh. As an example, faults within the base fault framework may be defined via patches where a patch can be assigned a state such as, for example, an "on" state or an "off" state. In an off state, a patch may be ignored structurally, as if the patch did not exist or existed to an extent that it would have minimal impact on a result or results. In an on state, a patch can be considered as a structural feature and, for example, a result or results may depend on the presence of that structural feature. As an example, a result or results may be volumetrics results, flow results, or one or more other types of result or results.

As an example, a method can provide for scenario based structural uncertainty analysis. For example, where faults are defined in a patch-wise manner, a scenario can be defined by assignment of patch states. As an example, where a fault framework includes faults defined by patches, the number of possible scenarios may be manifold. In such an example, a plurality of scenarios may be assessed via assignment of patch states using a common, base mesh. For example, the plurality of scenarios may be assessed without alteration of a base mesh.

As an example, fault patch states may be stored to memory (a storage medium) of or operatively coupled to a computer, a computing device, etc. As an example, a data structure can include a state value for a patch. As an example, one or more techniques may be implemented to change the state value in the data structure (e.g., an array, a vector, a table, etc.). As an example, a method may allow for manually changing a state value, automatically changing a state value and/or semi-automatically changing a state value. As an example, a process that changes a state value may be an assignment process that assigns a state via a state value (e.g., 0 for off, 1 for on, etc.).

An approach to estimation of structural uncertainties can include "deforming", using one or more of various techniques (e.g., mathematical or mechanical), a pre-defined and rigid "structural model". Such an approach may be undertaken where no "inter-object" relationships (e.g. fault-fault intersection and truncation styles) are altered.

As an example, advanced uncertainty estimations may assume that the relationships and the contact styles between structural objects are the result of interpretation and thus uncertainty (e.g., human interpretation uncertainty, machine interpretation uncertainty, etc.). As an example, an approach that allows for various permutations of these contacts can allow for capture of a broader view of an uncertainty spectrum or spectra, which may provide a more realistic understanding of structures in a geologic environment.

As an example, a patch-based approach to faults (e.g., intersected faults) can allow for permuting various fault-fault relationships, optionally in an automated or semi-automated manner. Such an approach can allow for scenario assessment in a rapid and robust fashion.

As an example, a method can include permuting various fault-fault relationships downstream in a "structural model construction" workflow. Such an approach can reduce time when compared to approaches that generate a new individual mesh for each permutation. Further, such an approach can help to assure convergence of one or more iterative solvers that receive mesh-based inputs. For example, where a base mesh provides for convergence of a scenario, an altered scenario that uses that base mesh is likely to provide for convergence as well.

Figure 5:
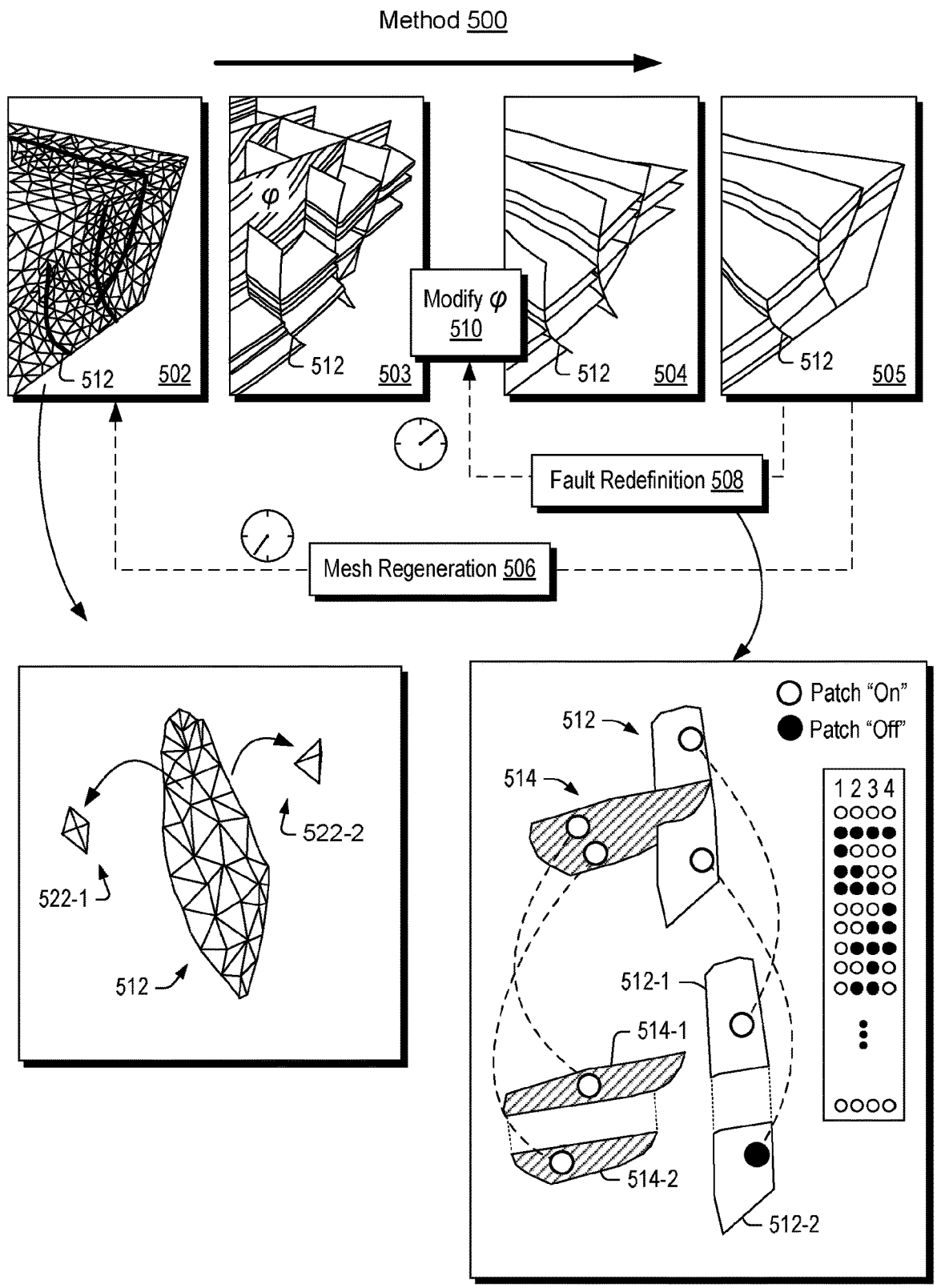
FIG. 5 illustrates examples of methods.

FIG. 5 shows an example of a method 500 that includes a mesh generation block 502, an implicit function solution block 503, a feature extraction block 504 and a model generation block 505. As shown in the example of FIG. 5, the method 500 can include one or more loops. For example, consider a mesh regeneration block 506 for regenerating a mesh and a fault redefinition block 508 for redefining one or more faults. As shown, the fault redefinition loop may be performed in a lesser amount of time than the mesh regeneration loop (e.g., for a given set of computing resources). As an example, the fault redefinition loop can include a modification block 510 for modifying implicit function values based on fault redefinition per the fault redefinition block 508. As mentioned, implicit function values may be stratigraphic attribute values that can guide feature extraction as in the block 504, for example, to generate a model such as a structural model as in the block 505.

In the example method 500 of FIG. 5, a fault 512 exists within the mesh of the mesh generation block 502. In such a mesh, the fault 512 is represented by a surface composed of triangles as may be defined by nodes where each triangle may be a face that is shared by two tetrahedra 522-1 and 522-2, one being to one physical side of the fault 512 and the other being to another opposite, physical side of the fault 512.

As an example, the fault 512 may be at least in part intersected by another fault 514, which likewise may be represented via triangles, nodes, etc. As an example, a fault definition scheme can utilize patches where, for example, the fault 512 can be defined to include a patch 512-1 and a patch 512-2 and the fault 514 can be defined to include a patch 514-1 and a patch 514-2. Given these four patches, where each patch can be in one of two states, various permutations exist, some of which are illustrated in FIG. 5. For example, the patch 512-2 may be turned "off" (e.g., be assigned an off state or a not existing state); whereas, the patches 512-1, 514-1 and 514-2 may be turned "on" (e.g., be assigned an on state or an existing state). In such an example, the fault redefinition block 508 may redefine one or more faults by assignment of a state to a patch or patches of those one or more faults. In such an example, the method 500 can include modifying implicit function values per the modification block 510 subject to such assignments per the block 508 where the blocks 504 and 505, or one or more other blocks may follow. Such an approach can be more expeditious than a method that performs mesh regeneration to account for existence or non-existence of a fault or a portion of a fault where such mesh regeneration generates a mesh such that the fault or the portion of the fault is (i.e., existence state) or is not (i.e., non-existence state) represented as a surface (e.g., faces of adjacent elements, etc.). Such an approach can also be more expeditious than an approach that involves solving for implicit function values based on a regenerated mesh that accounts for redefinition of faults.

Figure 6:
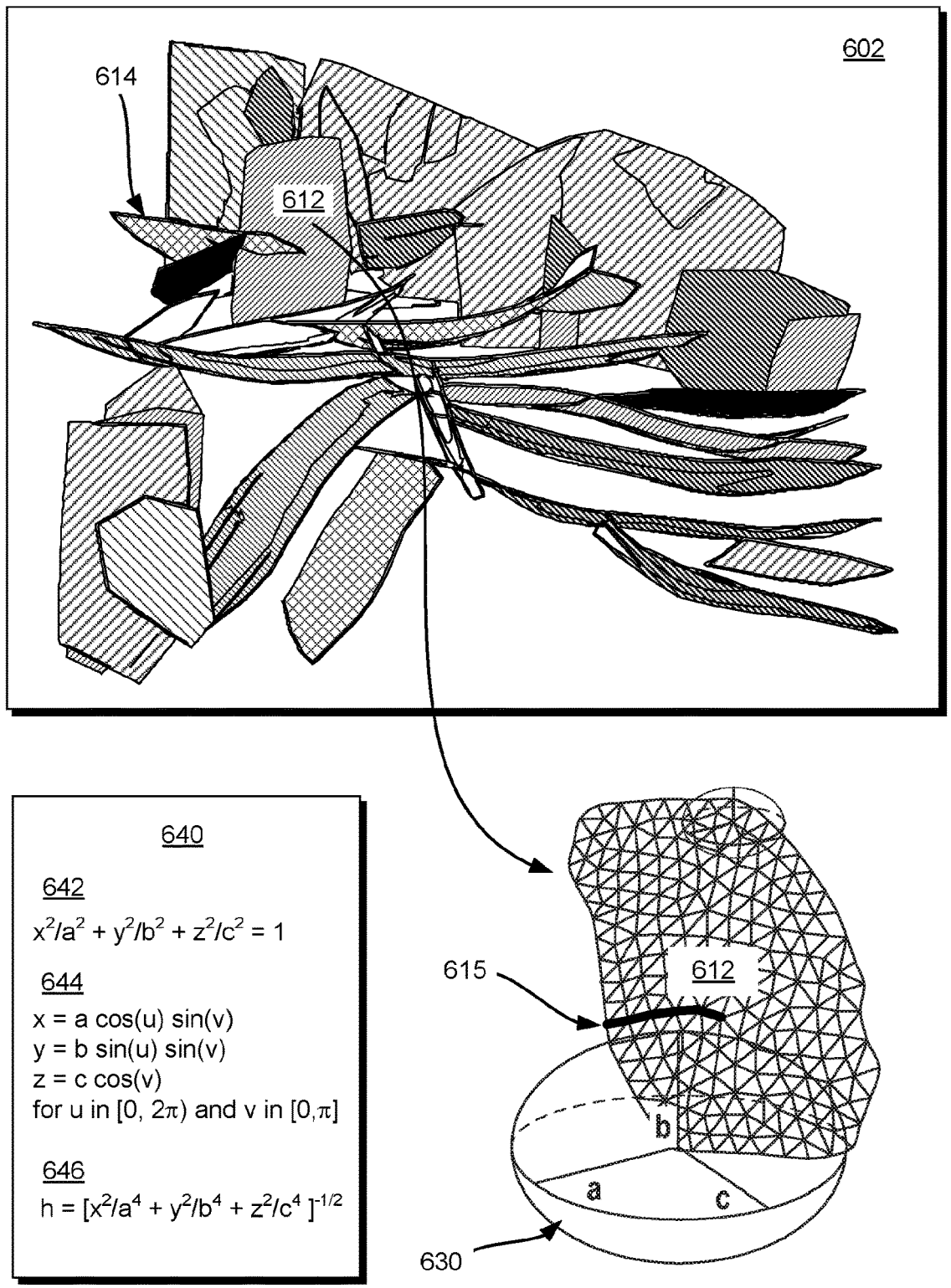
FIG. 6 illustrates examples of faults.

FIG. 6 shows an example of a fault framework 602 where a surface of a fault 612 can be represented via triangles (e.g., triangular faces, etc.). As an example, a degree of freedom (DOF) analysis may be referenced with respect to a geometric shape such as, for example, an ellipsoid 630. In the example of FIG. 6, the ellipsoid 630 includes parameters a, b and c, which may be utilized in one or more equations 640. For example, consider an equation for an ellipsoid 642, a parametric set of equations for an ellipsoid 644 and a support function equation 646 of an ellipsoid.

As an example, degree of freedom may be represented as an attribute of a fault, for example, where a, b, c of an ellipsoid may be assigned one or more values (e.g., values of two or more of a, b and c may be approximately the same or differ).

As an example, degree of freedom can, in a general form, be represented by an ellipsoid. For example, the major axis and the minor axis of an ellipsoid (e.g., centered on a node of a triangle-mesh) can be aligned with vectors of a global referential or a local referential. A method may implement an ellipsoid-based degree of freedom approach using, for example, one or more of a global and/or a local reference, which may depend on performance of one or more processes.

Referring again to FIG. 6, the ellipsoid 630 is centered on a node of the triangulated surface of the fault 612 where parameters a, b and c of the ellipsoid can quantify degree of freedom for the node.

As an example, for a given fault (e.g., or fracture), the degree of freedom of a node can define an "envelop" around an initial fault geometry. The latter can define, for example, a "realization space" in which the defined fault can theoretically take shape given one or more local constrains at a node following its degree of freedom. As an example, a realization may be a scenario where, for example, various scenarios can correspond to various realizations constrained by one or more realization spaces. As an example, another type of realization may be a scenario where, for example, various scenarios can correspond to various realizations constrained by assigned fault patch states.

FIG. 6 also shows a fault 614 where the fault 612 and the fault 614 intersect as represented by an intersection line 615 on the fault 612, which can correspond to a series of points (e.g., nodes, etc.). As an example, the intersection line 615 can be extended to define two patches for the fault 612 (e.g., an upper patch and a lower patch). As an example, the fault 612 may define two patches for the fault 614; noting that where a fault is intersected by a plurality of faults, additional patches may be defined.

As an example, a method that generates a structural model can include constructing a fault network or framework. For example, a user, optionally with the help of some automated heuristics, can utilize a computing system to define inter-fault relationships at intersection points. As an example, the intersection points can be nodes, which may be amenable to a degree of freedom approach. Further, such intersection points can be a basis for patch definitions.

As an example, at a given intersection, a pair of faults may be defined as including a major fault relative to the other one being a minor fault. Such definitions can help to determine truncations that can provide a "clean cut/onlap" (e.g., horizontally or vertically) of the minor fault onto the major one. As an example, in some instances, neither fault of a pair of faults is truncated against the other, which can result in an "X" shape.

As an example, in a method that constructs a structural model, a fault framework can be used to constrain mesh generation where the faults represent internal boundaries of the mesh. For example, the mesh of the block 502 of the method 500 of FIG. 5 can be a mesh generated according to constraints imposed by a fault framework. As mentioned, such a mesh can then be a host for an "implicit/stratigraphic" attribute of which calculated iso-values aim to correspond to features (e.g., modeled horizons).

Mesh generation and implicit function computation can involve some amount of user parameterization to produce a structural model that satisfies various modeling aims. For example, a modeling aim can be to achieve convergence for an iterative solver within several iterations. Where a mesh for one scenario is to be regenerated to explore another scenario, some amount of user parameterization may be, again, involved to satisfy one or more modeling aims.

As an example, a method can provide for exploration of scenarios while assuring that one or more modeling aims are met. For example, as explained with respect to the method 500 of FIG. 5, the fault redefinition block 508 may allow for reuse of a mesh and implicit function values corresponding to that mesh while exploring scenarios where that mesh may already satisfy various modeling aims. As such an approach may proceed without mesh regeneration, it can expedite assessment of scenarios. As an example, results stemming from such scenarios can help to reduce uncertainties that may exist as to physical realities in a geologic environment. Such an approach may allow for expeditious construction of a structural model that is of an acceptable certainty (e.g., reduced uncertainty).

As shown in the example of FIG. 5, the method 500 can include the modification block 510 where implicit function values are modified according to fault redefinition per the fault redefinition block 508. In such an example, assessment of scenarios may be expedited as time and/or resources for modifying implicit function values according to fault redefinition can be less than those for calculation of implicit function values via an implicit function solver.

As an example, a method can be an uncertainty run method that operates on a given mesh and a corresponding solution for implicit function values. In such a method, the uncertainty run can be for a scenario that corresponds to a possible definition of faults where such faults can include intersected faults that include patches. Such an approach may alleviate, for the uncertainty run, having to perform mesh generation and implicit function solution per the blocks 502 and 503 of the method 500 of FIG. 5. For example, the method 500 may be performed including the blocks 502 and 503 for a first scenario and then looped per the fault redefinition loop for one or more subsequent scenarios. In such an example, the scenarios can help to reduce uncertainty as to a structural model.

Figure 7:
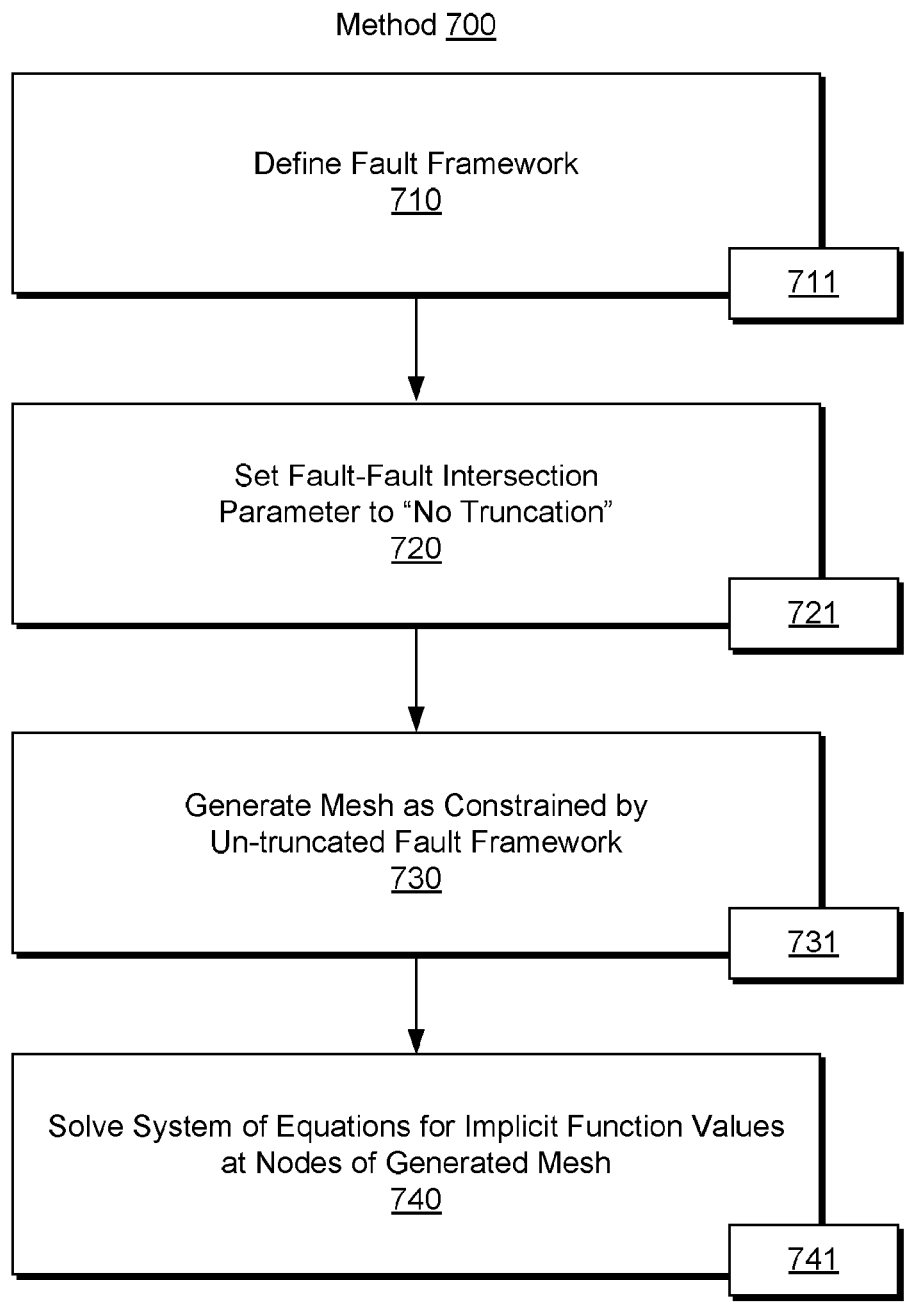
FIG. 7 illustrates an example of a method.

FIG. 7 shows an example of a method 700 that includes a definition block 710 for defining a fault framework, a set block 720 for setting one or more fault—fault intersection parameters to "no truncation", a generation block 730 for generating a mesh as constrained by the un-truncated fault framework and a solution block 740 for solving a system of equations for implicit function values at nodes of the generated mesh as constrained by the un-truncated fault framework. As mentioned, the implicit function can be a stratigraphic function, as it can relate to stratigraphy of a geologic environment. As an example, a first or base scenario or first or base case may proceed via generation of a tetrahedral mesh and solution of stratigraphic function; whereas, a subsequent scenario or subsequent case may proceed using that mesh and solution of the stratigraphic function.

In the example of FIG. 7, the method 700 can output implicit function values (e.g., stratigraphic function values) associated with a geologic environment as represented by the mesh as formulated by consideration of intersecting faults that are not truncated.

The method 700 is shown in FIG. 7 in association with various computer-readable media (CRM) blocks 711, 721, 731 and 741. Such blocks generally include instructions suitable for execution by one or more processors (or cores) to instruct a computing device or system to perform one or more actions. While various blocks are shown, a single medium may be configured with instructions to allow for, at least in part, performance of various actions of the method 700. As an example, a computer-readable medium (CRM) may be a computer-readable storage medium. As an example, the blocks 711, 721, 731 and 741 may be provided as instructions stored in a storage medium that is not a carrier wave, that is not a signal and that is non-transitory (see, e.g., the instructions 407 of the system 401 of FIG. 4).

Figure 8:
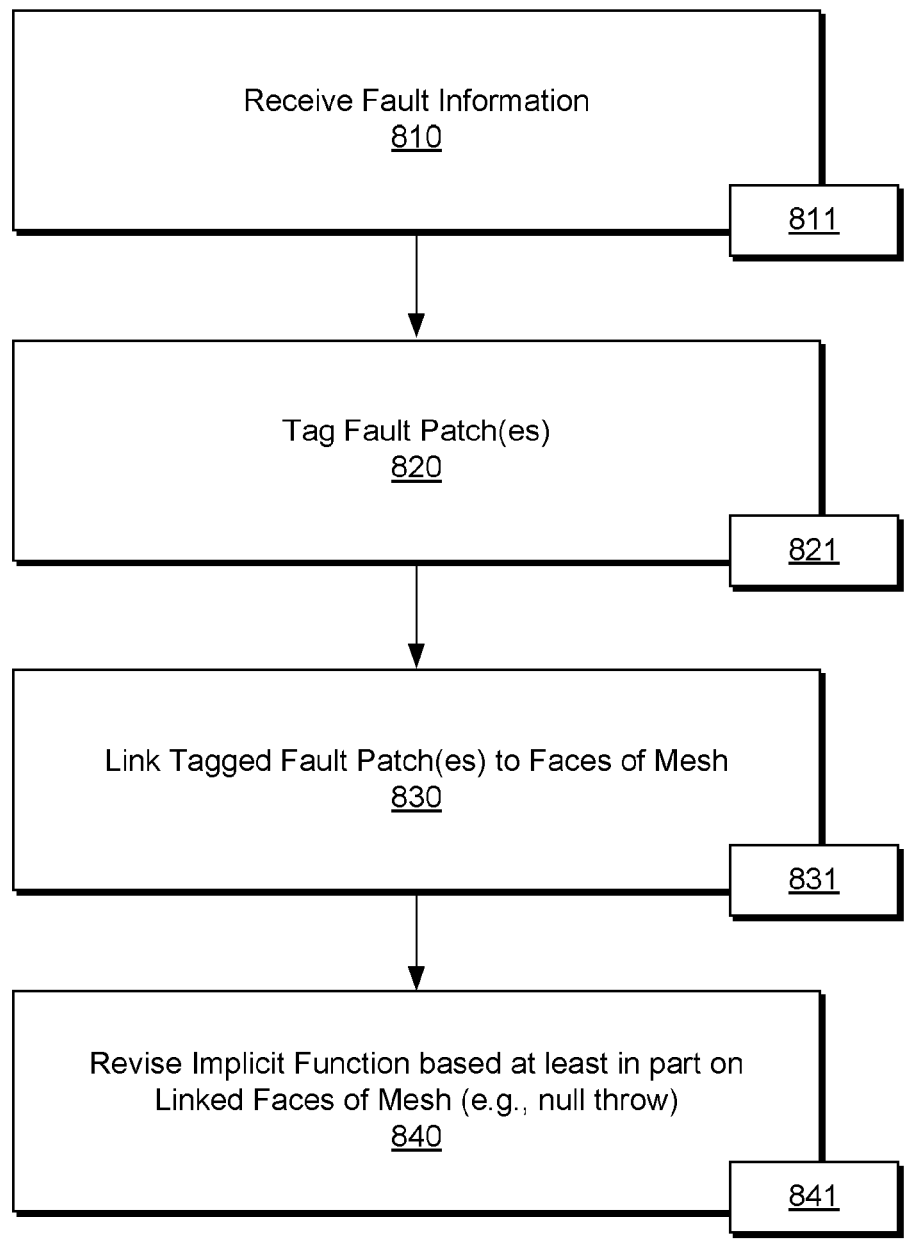
FIG. 8 illustrates an example of a method.

FIG. 8 shows an example of a method 800 that includes a reception block 810 for receiving fault information, a tag block 820 for tagging fault patch(es), a link block 830 for linking tagged fault patch(es) to faces of a mesh, a revision block 840 for revising implicit function values based at least in part on the linked faces of the mesh, for example, considering null throw where a tagged fault patch is tagged to be a non-existent patch.

In the example of FIG. 8, the revision block 840 can correspond to the modification block 510 of FIG. 5. As an example, a revision (e.g., a modification or an update) as to the implicit function (e.g., implicit function values) can include nulling the fault throw where, for example, a fault patch has been virtually removed according to a tag (e.g., a definition). As an example, such a revision may be performed locally. For example, consider updating tetrahedra that include faces constituting the virtual fault as well as, for example, one or more tetrahedra linked to the latter and not including input data (e.g., up to a pre-defined influence radius, etc.).

As an example, such an approach may be applied to generate different fault network scenarios, optionally by randomly removing fault patches from a structural model. For example, as mentioned with respect to FIG. 4, a patch can include various states where permutations can exist for intersecting faults. As an example, such permutations may form a set from which scenarios may be selected randomly and/or in one or more other manners.

The method 800 is shown in FIG. 8 in association with various computer-readable media (CRM) blocks 811, 821, 831 and 841. Such blocks generally include instructions suitable for execution by one or more processors (or cores) to instruct a computing device or system to perform one or more actions. While various blocks are shown, a single medium may be configured with instructions to allow for, at least in part, performance of various actions of the method 800. As an example, a computer-readable medium (CRM) may be a computer-readable storage medium. As an example, the blocks 811, 821, 831 and 841 may be provided as instructions stored in a storage medium that is not a carrier wave, that is not a signal and that is non-transitory (see, e.g., the instructions 407 of the system 401 of FIG. 4).

As an example, a method can include analyzing scenarios and/or results of scenarios as to geologic plausibility (e.g., which one is or which ones are more plausible than others).

Figure 9:
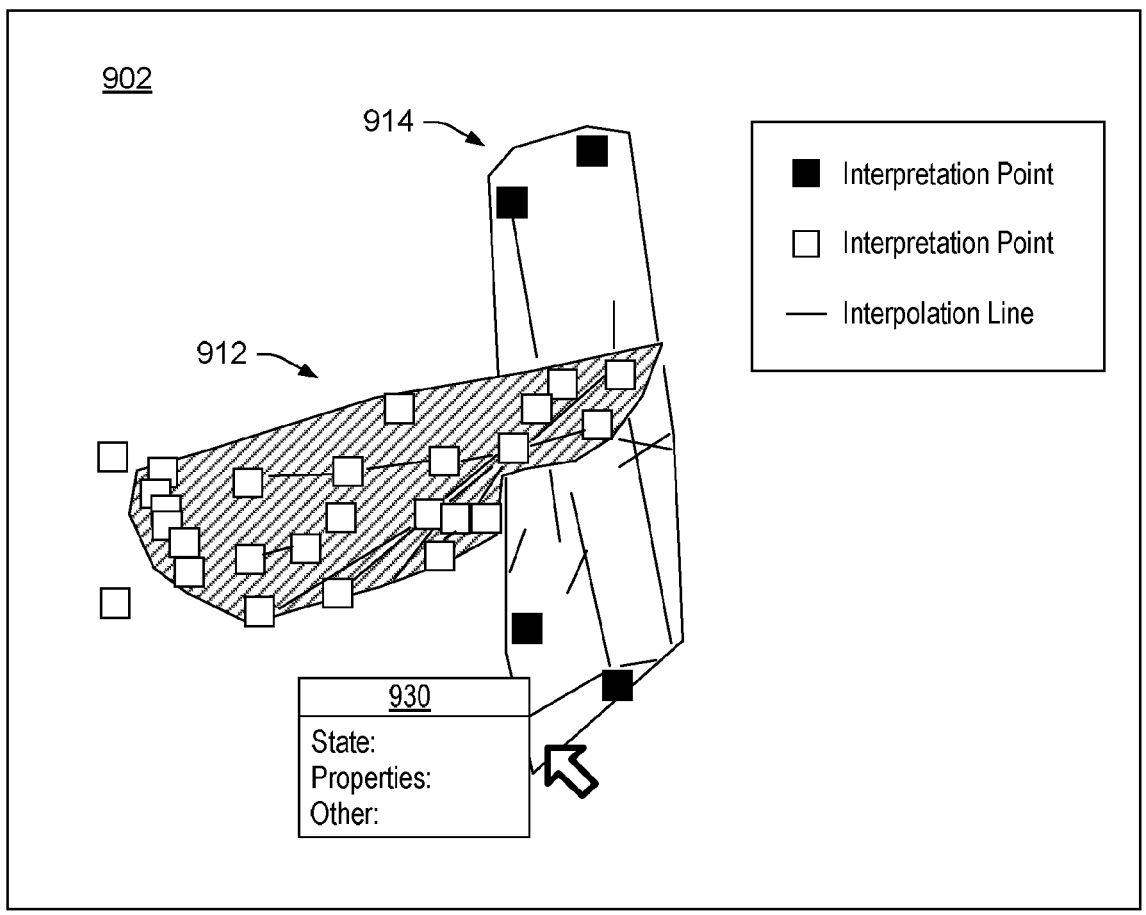
FIG. 9 illustrates examples of faults.
Figure 9:
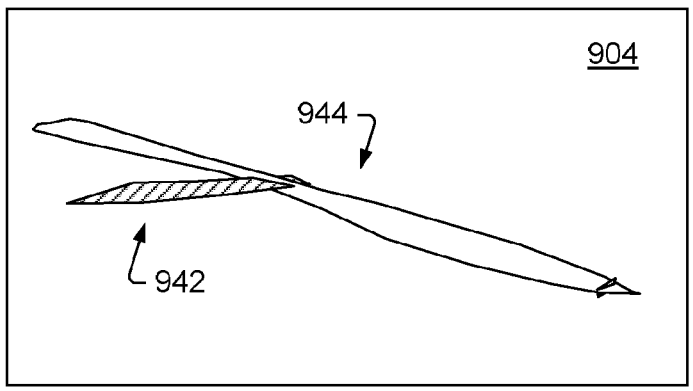
Figure 9:
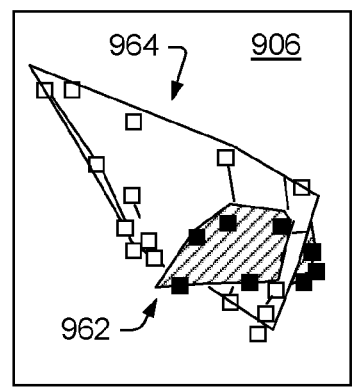

FIG. 9 shows examples of intersecting faults 902, 904 and 906 where such faults may be defined at least in part via one or more interpretation points (e.g., from an interpretation of data, etc.). In the examples of FIG. 9, the intersecting fault-pairs include different degrees of truncation style uncertainty.

As to the intersecting faults 902, as to a fault 912 and a fault 914, these intersecting faults may be classified as having relatively little uncertainty as to their truncation style. The intersecting faults 904, which include a fault 942 and a fault 944, these too may be classified as having relatively little uncertainty as to their truncation style. On the other hand, the intersecting faults 906, which appear to include a fault 962 and a fault 964, may be uncertain. For example, there may be multiple valid scenarios, including: the fault 964 is major over the fault 962 and the fault 962 is truncated; the fault 962 is major over the fault 964 and the fault 964 is truncated; and the faults 962 and 964 do not truncate each other.

As an example, a method can include associating a degree of confidence with a truncation rule a given fault-fault intersection. For example, such an approach can help to reduce the number of scenarios by activating/deactivating fault-patches at intersections with low degree of confidence and/or can help to assure that a fault network scenario tends to be "geologically" plausible (e.g., rather than a purely statistical guess).

As an example, a method can include implementing one or more rules, techniques, etc. that aim to generate an informed "guess" or a set of informed "guesses", which may help to reduce to a minimum involvement of end-user interactions. For example, consider setting of one or more empirical thresholds (e.g., based on heuristics). As an example, a distance to a threshold or distances to thresholds may be used as a first attempt to estimate degree of confidence of one or more truncation rules.

As an example, for four fault patches surrounding a given intersection, these may differ as to a rule-based weight and/or a rule-based removal likelihood amongst various cases to be generated. As an example, such a weight can be defined using one or more heuristics on a fault framework (e.g., using absolute sizes, or relative sizes against the different patches constituting a fault) or using throw information from implicit function values computed on a base mesh. As an example, a small throw may be an indicator that increases a removal likelihood; whereas, a large throw may be an indicator that decreases a removal likelihood.

As an example, a method can include determining a truncation rule's degree of confidence with respect to a fault-patch removal likelihood to define how probable in a given uncertainty run, a given fault-patch is, to be in-activated (e.g., set to a non-existent state).

As an example, a method can include a selection mechanism that can subsequently construct a chronostratigraphic representation of a model using one or more mechanical constrains (e.g., depospace transform) and evaluate energy associated with a change in state (e.g., to travel from the present day structures to an unfolded and unfaulted representation). Such an approach may consider that nature follows a lowest energy pathway. In such an example, scenarios that are high energy may be considered to be too costly to flatten. As an example, a method can include assigning fault patch states based at least in part on evaluation of energy as to transitions from past to present, present to past, etc. for a geologic environment.

FIG. 9 also shows an example of a menu 930 that may be rendered to a display in response to input to a computer, a computing system, etc. For example, the menu may be rendered in response to selection of a fault and/or a fault patch. As shown, a menu may allow for rendering information and/or changing information as to one or more of state, property or other (e.g., as may be stored in a data structure in a storage medium, etc.). For example, such a menu may allow for rendering a current state and/or assigning a state to a fault patch. As to properties, these may include physical (e.g., size, orientation, permeability, etc.) and/or mesh-related properties (e.g., number of faces, number of nodes, etc.). As to other, as an example, a method can include rendering implicit function values (e.g., stratigraphic function values) to a display where, for example, such values may optionally be selected for revision, revised, etc. As an example, a GUI may allow for revision of one or more implicit function values in a manual, automated and/or semi-automated manner. As an example, a method may allow for revisions associated with throw of a fault where, for example, a fault patch state has been transitioned from one state to another state.

As an example, slip can be defined as the relative movement of geological features present on either side of a fault and may be represented as a displacement vector. For example, a fault's sense of slip can be defined as the relative motion of rock on a side of the fault with respect to the other side. As an example, as to measuring horizontal and/or vertical separation, throw of a fault can be a vertical component (e.g., of dip separation) and heave of a fault can be a horizontal component (e.g., consider a description such as throw up and heave out. As an example, throw and/or heave may be represented by one or more vectors.

As an example, a downthrown block between two normal faults dipping towards each other can be referred to as a graben and an upthrown block between two normal faults dipping away from each other can be referred to as a horst. As an example, low-angle normal faults with regional tectonic impact may be designated detachment faults. As an example, a GUI may render information as to fault type to a display. For example, the menu 930 may include a selectable item that calls for rendering of a fault type to the display.

As an example, the menu 930 may include a selectable item that calls for rendering simulation information to a display such as, for example, flow simulation information (e.g., consider fluid flow values, contours, etc.). In such an example, a decision may be made as to the state of one or more fault patches (e.g., state assignment decision, etc.).

As an example, the menu 930 may include a selectable item that calls for rendering interpretation points to a display. As an example, the menu 930 may include a selectable item that calls for rendering nodes and/or faces to a display (e.g., fault patch nodes, fault patch triangular faces, etc.). As an example, the menu 930 may include a selectable item that calls for rendering an intersection line to a display that corresponds to intersection of two fault or, for example, intersection lines that correspond to more than two faults, etc. Various types of information may help a user in assigning one or more states.

As mentioned, a GUI may be rendered to a display where an input device and/or input mechanism allows for interactions. For example, the illustrations of FIGS. 1, 3, 5, 6 and 9 may represent GUIs that can be rendered to a display. As an example, where intersecting faults are defined at least in part via fault patches (see, e.g., FIG. 5 and FIG. 9, etc.), input may be received by the computer or computing system via an input device and/or an input mechanism to select a fault patch or fault patches and, for example, assign one or more states to a fault patch or fault patches. For example, a user may touch a touch screen display at a fault patch location where a touch may assign a state to the fault patch and/or open a menu for assignment of a state to the fault patch. As an example, a workflow can include rendering representations of fault patches to a display and receiving input to assign states to at least a portion of the fault patches. As an example, a method can allow a touch received at input via a touch screen to be a command that toggles a state from off to on or more on to off. In such an example, a user may readily touch fault patches to change (e.g., assign) states. While touch is mentioned, a mouse or other input device may be utilized where, for example, clicks may toggle states.

As an example, a GUI may render flow simulation results and fault patches such that a user may assess flow at or near one or more of the fault patches. For example, a user may utilize such a GUI for making decisions as to one or more fault patch states (e.g., optionally toggling state(s) based at least in part on flow simulation results overlaid with fault patches).

Figure 10:
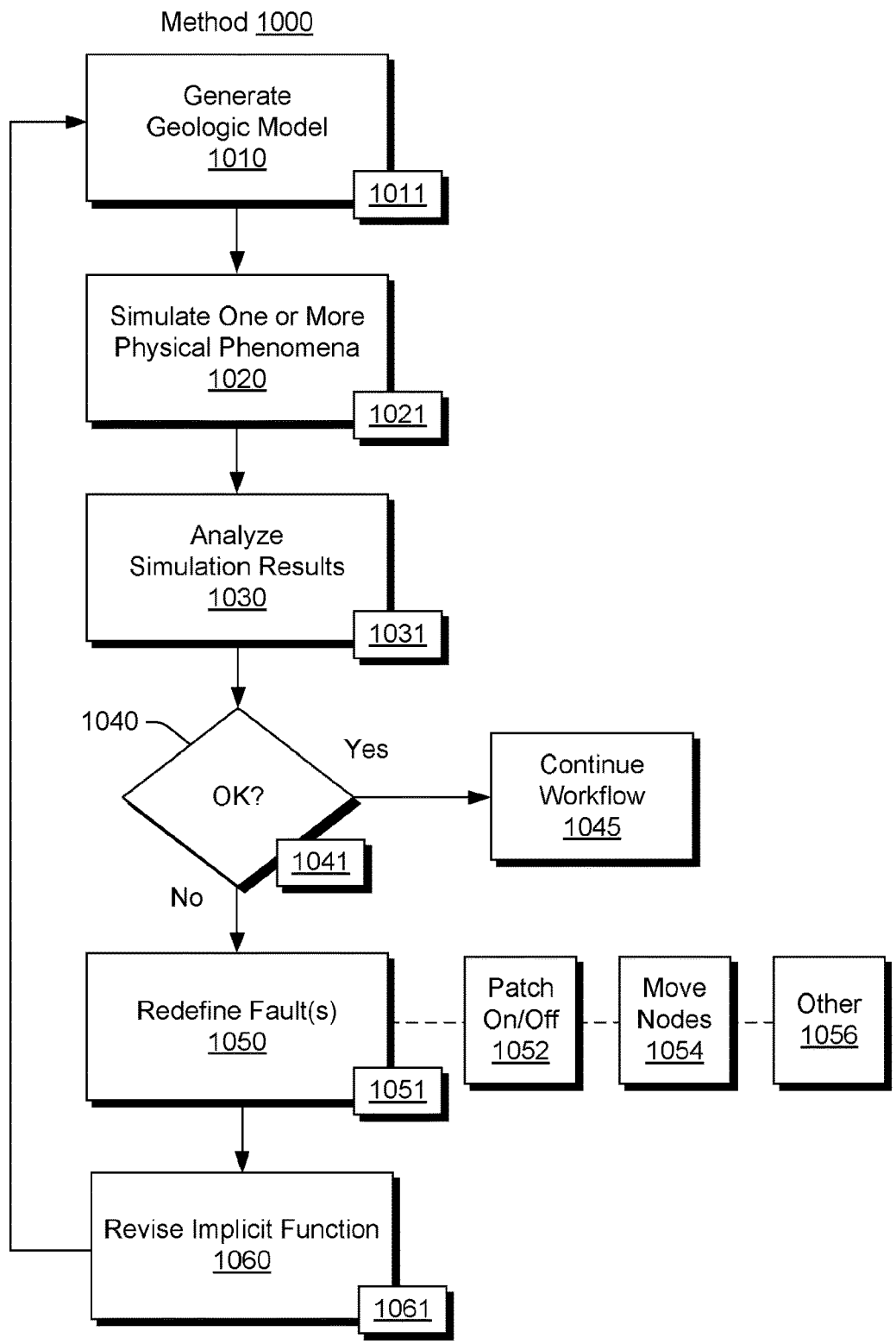
FIG. 10 illustrates an example of a method.

FIG. 10 shows an example of a method 1000 that includes a generation block 1010 for generating a geologic model, a simulation block 1020 for simulating one or more physical phenomena such as fluid flow, an analysis block 1030 for analyzing simulation results, a decision block 1040 for deciding whether the simulation results are acceptable, a redefinition block 1050 for redefining one or more faults where results are decided to be unacceptable, a revision block 1060 for revising implicit function values based at least in part on the redefining of one or more faults. In such an example, where the simulation results are decided to be acceptable, the method 1000 may continue along a workflow or workflows per the continuation block 1045. For example, the simulation results that are deemed acceptable may be utilized for one or more purposes and/or the geologic model may be utilized for one or more purposes given that it produced acceptable simulation results.

As shown in the example of FIG. 10, after revising implicit function values, the method 1000 may continue to the generation block 1010 to generate another geologic model. Such an approach may be a scenario based approach where a scenario is defined by the redefinition block 1050. As shown in the example of FIG. 10, the redefinition block 1050 may include a patch block 1052 for turning a patch on or off (e.g., assigning a state to a patch or patches), a move block 1054 for moving a node or nodes and/or an other block 1056 for performing one or more other actions as to fault redefinition.

As an example, the redefinition block 1050 may include redefining one or more faults based at least in part on simulation results. For example, where fluid flow is of a certain magnitude proximate to a small sized patch of a fault, the contribution of that small sized patch to the fault may be relatively small. In such an example, the small sized patch may be turned off.

The method 1000 is shown in FIG. 10 in association with various computer-readable media (CRM) blocks 1011, 1021, 1031, 1041 and 1051. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium. As an example, the blocks 1011, 1021, 1031, 1041 and 1051 may be provided as instructions stored in a storage medium that is not a carrier wave, that is not a signal and that is non-transitory (see, e.g., the instructions 407 of the system 401 of FIG. 4).

Figure 11:
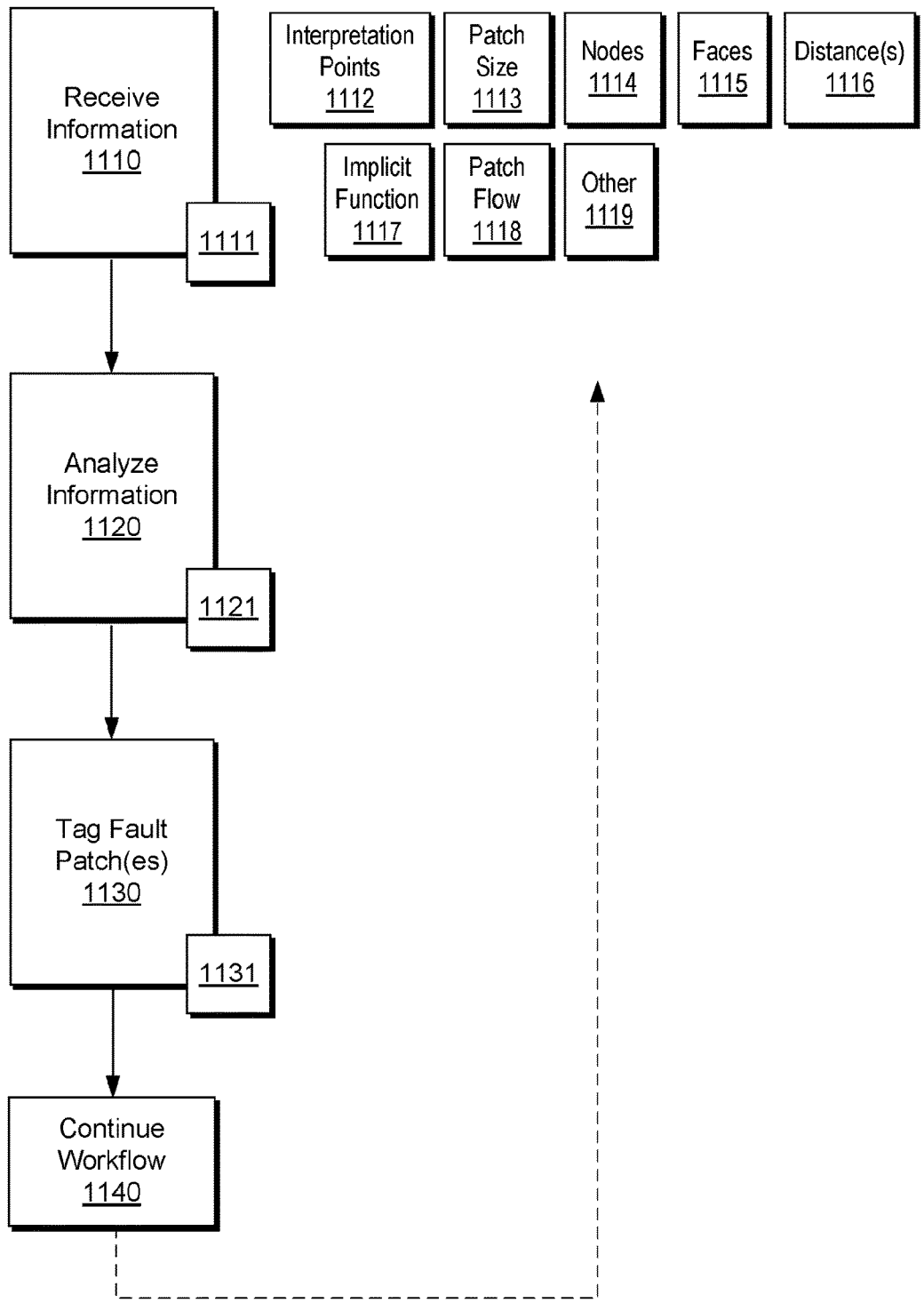
FIG. 11 illustrates an example of a method.

FIG. 11 shows an example of a method 1100 that includes a reception block 1110 for receiving information, an analysis block 1120 for analyzing information, a tag block 1130 for tagging one or more patches and a continuation block 1140 for continuing a workflow or workflows.

In the example of FIG. 11, the reception block 1110 can include receiving one or more types of information such as, for example, interpretation points 1112, patch size 1113, nodes 1114, faces 1115, a distance or distances 1116, implicit function values 1117, patch flow 1118, other 1119, etc. As an example, a method can include analyzing one or more types of information to determine a fault definition or fault definitions. For example, where a fault has a lesser number of interpretation points relative to another fault, such a situation may increase the likelihood of one or more patches of that fault being turned off. As an example, where a fault has a lesser density of interpretation points relative to another fault, such a situation may increase the likelihood of one or more patches of that fault being turned off. As an example, where a patch size and/or a fault size is small relative to another fault and/or another patch, a patch or patches of a fault may be turned off. As an example, where a patch and/or a fault includes a relatively small number of nodes, that patch and/or that fault may be turned off. As an example, where a patch and/or a fault includes a relatively small number of faces, that patch and/or that fault may be turned off. While various examples are cast as to lesser or smaller, corresponding examples may be cast as to greater or larger, which may call for turning a patch or patches of a fault on.

As an example, where a distance corresponds to a metric associated with modeling one or more physical phenomena, that distance may be utilized to determine a fault patch state. For example, where a patch or a fault is at a distance from a high flow region in a geologic environment, that distance may be compared to a threshold distance or threshold metric to determine whether the state of the patch and/or the states of patches of the fault.

Figure 12:
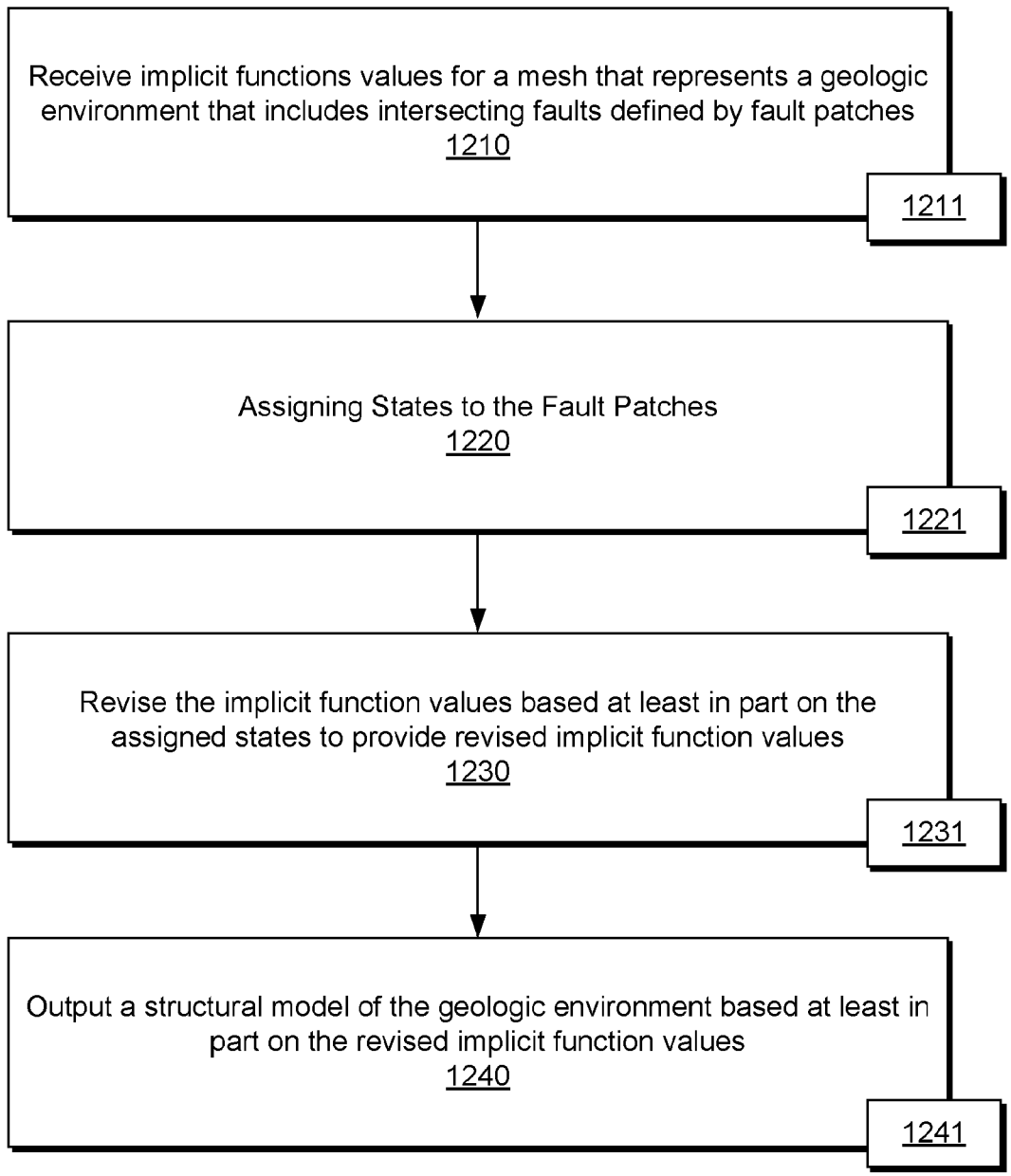
FIG. 12 illustrates an example of a method.

FIG. 12 shows an example of a method 1200 that includes a reception block 1210 for receiving implicit functions values for a mesh that represents a geologic environment that includes intersecting faults defined by fault patches, an assignment block 1220 for assigning states to the fault patches, a revision block 1230 for revising the implicit function values based at least in part on the assigned states to provide revised implicit function values and an output block 1240 for outputting a structural model of the geologic environment based at least in part on the revised implicit function values.

The method 1200 is shown in FIG. 12 in association with various computer-readable media (CRM) blocks 1211, 1221, 1231 and 1241. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1200. As an example, a computer-readable medium (CRM) may be a computer-readable storage medium. As an example, the blocks 1211, 1221, 1231, and 1241 may be provided as instructions stored in a storage medium that is not a carrier wave, that is not a signal and that is non-transitory (see, e.g., the instructions 407 of the system 401 of FIG. 4).

As an example, the method 1200 can include receiving a mesh that is based at least in part on a fault network or fault framework and, for example, solving for implicit function values. In such an example, solving for implicit function values may be based at least in part on interpretation information stemming from one or more sources. For example, a source may be a seismic data source. In such an example, a seismic interpretation framework may be used to identify structural features in a geologic environment such as, for example, horizons, that correspond to indicia in seismic data, one or more attributes derived from seismic data, etc. As an example, a fault network or fault framework may be based at least in part on seismic data from a seismic data source and/or data from one or more other sources (e.g., consider sources of borehole data, surface data, etc.). As an example, data associated with a geologic environment that can be utilized in a method can include lithostratigraphic column data, regional tectonic framework data, directional survey data, logging while drilling (LWD) data, electromagnetic data, gamma ray data, spectroscopy data, seismic data, etc.

As an example, a method can include acquiring data in a geologic environment via acquisition equipment in the geologic environment. For example, consider a seismic survey that utilizes seismic energy sources and seismic energy receivers where seismic energy that travels in the geologic environment, interacts with features in the geologic environment and that is received by the seismic energy receivers can analyzed to identify one or more of the features (e.g., spatially locate a feature, an extent of a feature, etc.).

As an example, a fault patch can be a surface that represents at least a portion of a fault. As an example, a fault patch can be assigned one or more states. As an example, a state may be an existence state. In such an example, the existence state may be further characterized by one or more additional states. For example, consider a no flow state or a flow state. As an example, a state of a fault patch may be a permeability state that characterizes permeability of the fault patch, a porosity state that characterizes porosity of the fault patch, a transmissibility state that characterizes transmissibility of the fault patch, etc. As an example, a fault patch state may be a major state or a minor state. In such an example, a major state may correspond to a major fault while a minor state may correspond to a minor fault.

As an example, assigning a state to a fault patch may be based on information. As an example, assigning a state to a fault patch may be based on a statistical selection technique such as, for example, a random statistical selection technique.

As an example, a method that includes revising implicit function values may include revising implicit function values to account for lack of a fault throw. For example, where a fault patch state is changed from an "on" state to an "off" state, implicit function values (e.g., stratigraphic function values) may be revised from exhibiting a throw to not exhibiting a throw (e.g., revising values that may smooth values in a region of a mesh proximate to a fault, etc.).

As an example, a method may include restoration where, for example, a simulation aims to determine a state of a geologic environment at a past time or past times. As an example, such a method may unfold portions of a geologic environment. As an example, such a method may include forward simulation that may uncover fault formation with respect to time. As an example, a method can include matching predicted faults with existing faults and, for example, revising a model based at least in part on such matching. As an example, such a method may be performed where results therefrom may be utilized to inform assignment of fault patch states.

As an example, a method can include analyzing production behaviors for production of fluid or fluids from a geologic environment. Such a method may include modeling distribution of lithofacies in the geologic environment. As an example, a method may include representing faults (e.g., and optionally fractures, etc.) as elements that can influence production performance. As an example, various types of data may be utilized to determine how faults can be mapped to a reservoir model. As an example, such an approach may be multi-scale (e.g., seismic scale, bore scale, etc.). Upon established a fault framework for a field, a method can include determining to what extent fluid flow communication may occur across various faults. Such an approach may involve a likelihood or probability analysis. As an example, a method may consider that some sealing faults may break down and open up to flow after a field has been producing for a few years. For example, consider a method that includes considering changes in stress state of a reservoir as a result of pressure depletion.

As an example, a method can include analyzing activation and/or deactivation of faults. In such an example, fault patch assignments may be based on information such as activation and/or deactivation information, which may be associated with changes in stress, etc. As an example, where a stimulation treatment may be utilized, assignments may be based on such a treatment. As an example, sets of assignments may correspond to scenarios where one or more scenarios may inform a stimulation treatment. For example, a method can include performing a stimulation treatment or stimulation treatments based at least in part on results of a scenario or scenarios. As an example, a stimulation treatment may be a pressure-based treatment. As an example, a stimulation treatment may be or include hydraulic fracturing.

As an example, a natural fracture prediction workflow may include receiving information from a scenario or scenarios. As an example, a natural fracture prediction workflow may include calibrating based at least in part on results for a scenario or scenarios. As an example, calibrating can include receiving borehole data germane to fracture and/or fault locations and assessing such data with respect to one or more scenarios. As an example, a scenario may be selected as being a best representation with respect to borehole data (e.g., a best match, etc.). As an example, borehole data may be utilized, for example, in a method that includes filtering scenarios where certain scenarios may be filtered out or selected based at least in part on borehole data. In such an example, scenarios may be filtered prior to structural model building and simulation of physical phenomenon or physical phenomena. For example, assignments of states to fault patches may be based at least in part on borehole data (e.g., to select assignments that match borehole data).

As an example, a method can include perturbing a stress field of a geologic environment. In such an example, the method can include assessing streamlines aligned with natural fractures. As an example, such an approach may access a scenarios database where matching of stress perturbation results to one or more scenarios may occur. In such an example, the scenarios database can include various scenarios of a fault framework where one or more may help to explain at least a portion of natural fractures in a geologic environment, which may be actual natural fractures, natural fractures generated in stress perturbation simulation, etc. As an example, such an approach may be linked to a stimulation treatment, whether actual and/or simulated (e.g., simulated hydraulic fracturing, etc.).

As an example, the method 1200 of FIG. 12 may be implemented at least in part in a framework such as, for example, the PETREL® framework. As an example, a framework may be a structural modeling framework or a framework utilized in a structural modeling workflow. As an example, the method 1200 may be implemented in a workflow that includes utilizing the PETROMOD® framework. As an example, the method 1200 may be implemented in a workflow that includes utilizing the MANGROVE® framework.

As an example, a method can include receiving implicit functions values for a mesh that represents a geologic environment that includes intersecting faults defined by fault patches; assigning states to the fault patches; revising the implicit function values based at least in part on the assigned states to provide revised implicit function values; and outputting a structural model of the geologic environment based at least in part on the revised implicit function values. In such an example, the method can include simulating one or more physical phenomena using the structural model of the geologic environment. For example, such a method can include executing processor-executable instructions using one or more processors of a computing system to receive implicit function values associated with a mesh that includes nodes that represent intersecting faults defined by fault patches, to assign states to the fault patches and to output a structural model where the computing system or another computing system can execute processor-executable instructions to simulate one or more physical phenomena using the structural model (e.g., consider simulation of fluid flow, which can include simulation of fluid flow at or near one or more of the faults, etc.).

As an example, a mesh can be or include a tetrahedral mesh. As an example, a mesh can be a space-filling mesh (e.g., a volumetric mesh that space fills a three-dimensional region that represents a geologic environment).

As an example, a pair of intersecting faults can include four fault patches defined at least in part by a line of intersection (e.g., where one fault passes through another fault, etc.).

As an example, states assigned to fault patches can include an on state and an off state where the on state corresponds to existence of a corresponding one of the fault patches and where the off state corresponds to non-existence of a corresponding one of the fault patches.

As an example, a mesh can correspond to a fault framework, which may be, for example, a plurality of faults (e.g., a fault network) that includes one or more intersecting pairs of faults. As an example, a single fault may be intersected at least in part by a plurality of faults. As an example, a fault may be a non-intersected fault that may be represented, for example, via a single fault patch or may be represented as a fault (e.g., without a patch or patches). As an example, a fault framework can include un-truncated intersecting faults. As an example, un-truncated intersecting faults can be defined at least in part by fault patches. As an example, where a fault truncates at another fault, a fault patch approach may optionally define two fault patches for one fault and a single fault patch for the other fault to account for possible flow and/or other physical phenomena associated with the two faults (e.g., interactions of flow, etc.).

As an example, implicit function values can include stratigraphic function values (e.g., values that can represent stratigraphy of a geologic environment).

As an example, a method can include assigning states to fault patches by randomly assigning states to the fault patches. As an example, assigning states to fault patches can include assigning states to the fault patches based at least in part on a likelihood metric where, for example, the likelihood metric may be a likelihood of existence metric or a likelihood of non-existence metric and/or a likelihood of contributing to a physical phenomenon metric or a likelihood of not contributing to a physical phenomenon metric. As an example, various fault patch properties may be defined for individual fault patches where one or more of such properties may be a basis for assigning states to fault patches.

As an example, a fault patch property may be a physical property and/or a mesh property. As an example, where a fault patch is unlikely to contribute and/or effect fluid flow, such a fault patch may be assigned an off state and/or in a selection process, may be assigned a parameter that causes a less frequent and/or a less likely probability of selection.

As an example, an assignment process can be based at least in part on simulation results. For example, a method can include simulating flow using a structural model and then assigning fault patch states based at least in part on flow simulation results. For example, where flow is below a threshold value proximate to a fault patch, that fault patch may be assigned an off state (e.g., optionally turned off as to further structural model development, etc.). As an example, where flow is above a threshold value proximate to a fault patch, that fault patch may be assigned an on state (e.g., optionally turned on as to further structural model development, etc.). As an example, a loop may be formed in a workflow as to structural model development and simulation of one or more physical phenomena, which may revise a structural model to a level that is deemed acceptable (e.g., as to model complexity, representation of flow, simulation results for a region of interest, etc.).

As an example, a workflow can include simulating and/or acquiring information associated with one or more stimulation treatments (e.g., hydraulic fracturing, etc.). As an example, a workflow can include simulating and/or acquiring information associated with production and/or injection of fluid or fluids from a reservoir. For example, a structural model may be revised (e.g., fault patch states assigned, etc.), based at least in part on production and/or injection. As an example, such a revision may account for changes that occur in a reservoir (e.g., depression due to depletion, expansion due to injection, etc.).

As an example, a system can include a processor; memory operatively coupled to the processor; processor-executable instructions stored in the memory to instruct the system to: receive implicit functions values for a mesh that represents a geologic environment that includes intersecting faults defined by fault patches; assign states to the fault patches; revise the implicit function values based at least in part on the assigned states to provide revised implicit function values; and output a structural model of the geologic environment based at least in part on the revised implicit function values. In such an example, the states can include an on state and an off state where the on state corresponds to existence of a corresponding one of the fault patches and where the off state corresponds to non-existence of a corresponding one of the fault patches. As an example, instructions to assign states can include instructions to assign states to fault patches based at least in part on a likelihood metric.

As an example, one or more computer-readable storage media can include processor-executable instructions where the instruction include instructions to instruct a system to: receive implicit functions values for a mesh that represents a geologic environment that includes intersecting faults defined by fault patches; assign states to the fault patches; revise the implicit function values based at least in part on the assigned states to provide revised implicit function values; and output a structural model of the geologic environment based at least in part on the revised implicit function values. In such an example, the states can include an on state and an off state where the on state corresponds to existence of a corresponding one of the fault patches and where the off state corresponds to non-existence of a corresponding one of the fault patches. As an example, instructions to assign states can include instructions to assign states to the fault patches based at least in part on a likelihood metric.

Figure 13:
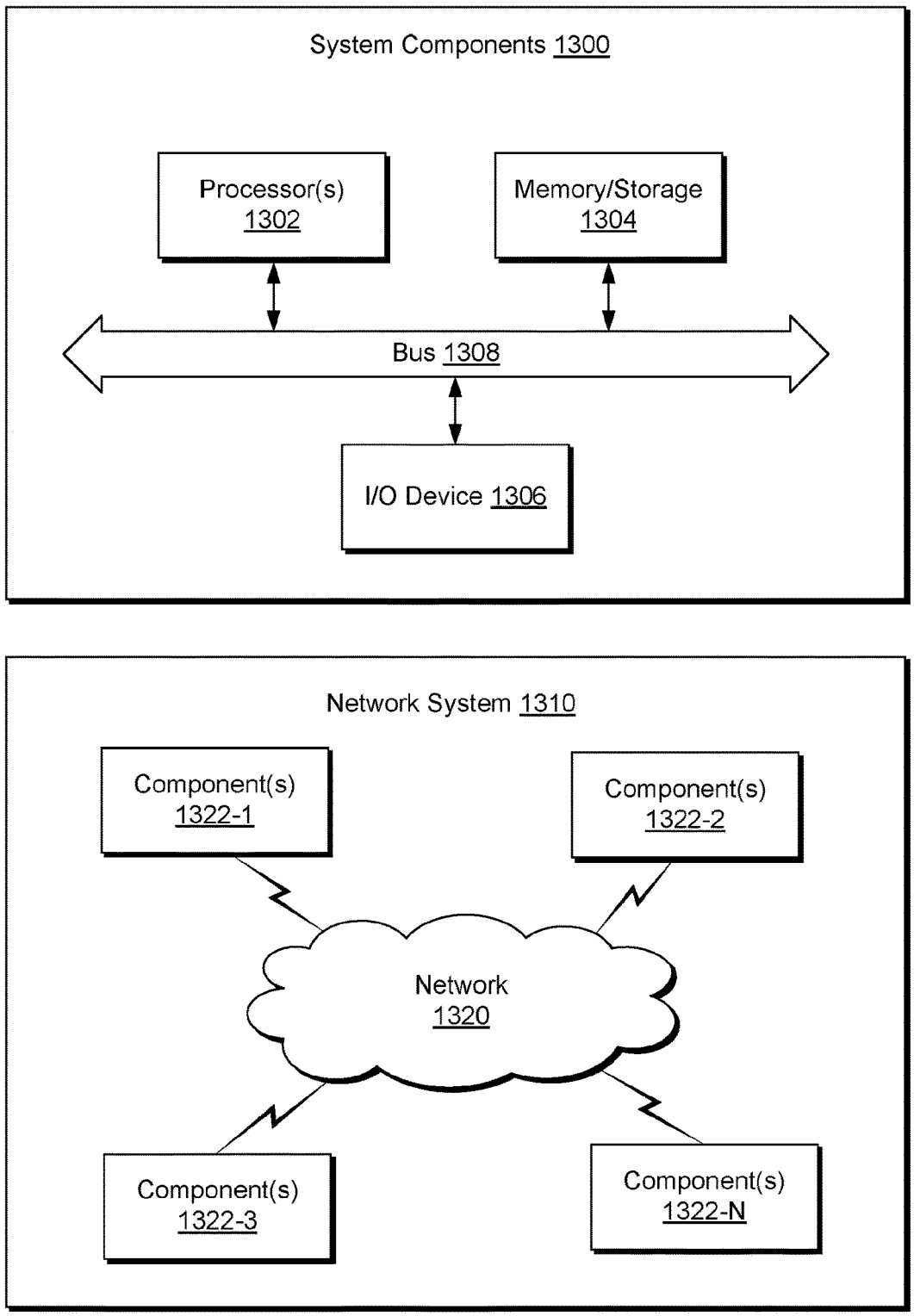
FIG. 13 illustrates example components of a system and a networked system.

FIG. 13 shows components of an example of a computing system 1300 and an example of a networked system 1310. The system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s)

1322-3 may include memory accessible by the processor(s) 1302. Further, the component(s) 1302-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving implicit functions values for a mesh that represents a geologic environment that comprises intersecting faults defined by fault patches;
assigning on and off states to the fault patches based at least in part on a likelihood metric, wherein the on state indicates existence of one of the fault patches and the off state indicates non-existence of one of the fault patches;
revising the implicit function values based at least in part on the assigned on and off states to provide revised implicit function values; and
outputting a structural model of the geologic environment based at least in part on the revised implicit function values.

2. The method of claim 1 comprising simulating one or more physical phenomena using the structural model of the geologic environment.

3. The method of claim 2 wherein at least one of the one or more physical phenomena comprises fluid flow.

4. The method of claim 1 wherein the mesh comprises a tetrahedral mesh.

5. The method of claim 1 wherein a pair of intersecting faults comprises four fault patches defined at least in part by a line of intersection.

6. The method of claim 1 wherein the mesh corresponds to a fault framework.

7. The method of claim 6 wherein the fault framework comprises un-truncated intersecting faults.

8. The method of claim 7 wherein the un-truncated intersecting faults are defined by the fault patches.

9. The method of claim 1 wherein the implicit function values comprise stratigraphic function values.

10. The method of claim 1 comprising randomly assigning states to the fault patches.

11. The method of claim 1 wherein the likelihood metric comprises a likelihood of existence metric or a likelihood of non-existence metric.

12. The method of claim 1 wherein the likelihood metric comprises a likelihood of contributing to a physical phenomenon metric or a likelihood of not contributing to a physical phenomenon metric.

13. The method of claim 1, wherein the likelihood metric corresponds to amount of throw.

14. The method of claim 13, wherein the amount of throw is computed from at least a portion of the implicit function values on the mesh.

15. The method of claim 1, wherein the revised implicit function values null a throw for at least one fault patch assigned the off state.

16. A system comprising:
a processor;
memory operatively coupled to the processor;
processor-executable instructions stored in the memory to instruct the system to:
receive implicit functions values for a mesh that represents a geologic environment that comprises intersecting faults defined by fault patches;
assign on and off states to the fault patches based at least in part on a likelihood metric, wherein the on state indicates existence of one of the fault patches and the off state indicates non-existence of one of the fault patches;
revise the implicit function values based at least in part on the assigned on and off states to provide revised implicit function values; and output a structural model of the geologic environment based at least in part on the revised implicit function values.

17. One or more computer-readable storage media comprising processor-executable instructions wherein the instruction comprise instructions to instruct a system to:
receive implicit functions values for a mesh that represents a geologic environment that comprises intersecting faults defined by fault patches;
assign on and off states to the fault patches based at least in part on a likelihood metric, wherein the on state indicates existence of one of the fault patches and the off state indicates non-existence of one of the fault patches;
revise the implicit function values based at least in part on the assigned on and off states to provide revised implicit function values; and
output a structural model of the geologic environment based at least in part on the revised implicit function values.

18. A method comprising:
receiving implicit functions values for a mesh that represents a geologic environment that comprises intersecting faults defined by fault patches;
assigning on and off states to the fault patches using throw information from implicit function values computed on the mesh, wherein the on state indicates existence of one of the fault patches and the off state indicates non-existence of one of the fault patches;
revising the implicit function values based at least in part on the assigned on and off states to provide revised implicit function values; and
outputting a structural model of the geologic environment based at least in part on the revised implicit function values.

19. The method of claim 18, wherein the revised implicit function values null a throw for at least one fault patch assigned the off state.

* * * * *